US011102735B2

(12) United States Patent
Lee

(10) Patent No.: US 11,102,735 B2
(45) Date of Patent: Aug. 24, 2021

(54) METHOD AND DEVICE PERFORMING COMMUNICATION IN WIRELESS COMMUNICATION SYSTEM

(71) Applicant: Samsung Electronics Co., Ltd., Suwon-si (KR)

(72) Inventor: Hyunyong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 15/999,428

(22) PCT Filed: Feb. 17, 2017

(86) PCT No.: PCT/KR2017/001797
§ 371 (c)(1),
(2) Date: Aug. 17, 2018

(87) PCT Pub. No.: WO2017/142358
PCT Pub. Date: Aug. 24, 2017

(65) Prior Publication Data
US 2019/0281563 A1   Sep. 12, 2019

Related U.S. Application Data

(60) Provisional application No. 62/296,154, filed on Feb. 17, 2016.

(51) Int. Cl.
*H04W 56/00* (2009.01)
*H04W 72/00* (2009.01)
(Continued)

(52) U.S. Cl.
CPC ........ *H04W 56/001* (2013.01); *H04B 7/0617* (2013.01); *H04B 7/0695* (2013.01);
(Continued)

(58) Field of Classification Search
CPC ... H04W 56/001; H04W 56/00; H04W 74/00; H04W 74/0833; H04W 72/0446;
(Continued)

(56) References Cited

U.S. PATENT DOCUMENTS

2001/0038673 A1 * 11/2001 Olafsson ............. H04L 25/4927
375/354
2012/0307726 A1   12/2012 Pi et al.
(Continued)

FOREIGN PATENT DOCUMENTS

KR   10-2013-0028397 A   3/2013
KR   10-2013-0103442 A   9/2013
(Continued)

OTHER PUBLICATIONS

ISA/KR, "International Search Report," International Application No. PCT/KR2017/001797, dated May 17, 2017, 5 pages.
(Continued)

*Primary Examiner* — Jeffrey M Rutkowski
*Assistant Examiner* — Sudesh M Patidar

(57) ABSTRACT

Disclosed is a 5G or pre-5G communication system for supporting a data transmission rate higher than that of a 4G communication system such as LTE. According to one embodiment of the present invention, a method of a base station in a wireless communication system can comprise the steps of: generating a first synchronization signal; confirming symbol index information on a plurality of symbols transmitted through beams in directions different from each other; and transmitting the first synchronization signal and the symbol index information in each of the plurality of symbols.

4 Claims, 30 Drawing Sheets

(51) Int. Cl.

| | | |
|---|---|---|
| *H04W 72/04* | (2009.01) | |
| *H04L 27/26* | (2006.01) | |
| *H04B 7/06* | (2006.01) | |
| *H04J 11/00* | (2006.01) | |
| *H04J 13/00* | (2011.01) | |
| *H04L 5/00* | (2006.01) | |

(52) U.S. Cl.
CPC ....... *H04J 11/0073* (2013.01); *H04J 13/0062* (2013.01); *H04L 5/00* (2013.01); *H04L 27/2613* (2013.01); *H04L 27/2656* (2013.01); *H04L 27/2692* (2013.01); *H04W 72/005* (2013.01); *H04W 72/048* (2013.01); *H04W 72/0446* (2013.01); *H04L 27/2675* (2013.01)

(58) Field of Classification Search
CPC . H04W 72/048; H04W 72/005; H04W 48/16; H04W 48/02; H04W 48/10; H04W 48/12; H04W 56/0085; H04B 7/0617; H04B 7/697; H04B 7/0615; H04B 7/695; H04L 5/00; H04L 5/0078; H04L 27/2656; H04L 27/2613; H04L 27/2692; H04L 27/2675; H04L 27/26132; H04L 27/261; H04L 27/2655; H04J 11/0073; H04J 11/0076; H04J 11/0079; H04J 13/0062; H04J 13/0059
USPC .......................................................... 370/312
See application file for complete search history.

(56) References Cited

U.S. PATENT DOCUMENTS

| | | | |
|---|---|---|---|
| 2013/0064239 A1 | 3/2013 | Yu et al. | |
| 2013/0195069 A1* | 8/2013 | Frederiksen | H04W 48/12 370/330 |
| 2013/0235851 A1 | 9/2013 | Abu-Surra et al. | |
| 2014/0219162 A1* | 8/2014 | Eyuboglu | H04L 69/28 370/315 |
| 2014/0301353 A1 | 10/2014 | Frenne et al. | |
| 2016/0277225 A1* | 9/2016 | Frenne | H04W 56/0015 |
| 2017/0150461 A1* | 5/2017 | Li | H04L 27/2662 |
| 2017/0207845 A1 | 7/2017 | Moon et al. | |
| 2017/0237463 A1* | 8/2017 | Zheng | H04W 16/14 370/328 |
| 2017/0245259 A1* | 8/2017 | Islam | H04L 5/0053 |
| 2017/0245260 A1* | 8/2017 | Islam | H04L 5/0053 |
| 2018/0213500 A1* | 7/2018 | Li | H04W 56/00 |

FOREIGN PATENT DOCUMENTS

| | | |
|---|---|---|
| KR | 10-2014-0035930 A | 3/2014 |
| KR | 10-2017-0022933 A1 | 3/2017 |
| WO | 2015-080649 A1 | 6/2015 |

OTHER PUBLICATIONS

European Patent Office, "Supplementary European Search Report," Application No. EP17753519.2, dated Dec. 6, 2018, 12 pages.
TS 5G.211 v2.6 (Sep. 2016), Technical Specification, KT PyeongChang 5G Special Interest Group (KT 5G-SIG); KT 5th Generation Radio Access; Physical Layer; Physical channels and modulation (Release 1), Sep. 2016, 66 pages.
Ericsson, "Higher layer implications of beamforming during random access," Tdoc R-1700881, 3GPP TSG-RAN WG2 #97, Athens, Greece, Feb. 13-17, 2017, 5 pages.

* cited by examiner

FIG. 13

| Value (hexa-decimal) | RNTI |
|---|---|
| 0000 | N/A |
| 0001-003C | RA-RATI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

FIG. 15

| Type | Search space $S_k^{(L)}$ | | Number of PDCCH candidate $M^{(L)}$ |
|---|---|---|---|
| | Aggregation level $L$ | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

METHOD AND DEVICE PERFORMING COMMUNICATION IN WIRELESS COMMUNICATION SYSTEM

CROSS-REFERENCE TO RELATED APPLICATIONS AND CLAIM OF PRIORITY

This application is a 371 National Stage of International Application No. PCT/KR2017/001797 filed Feb. 17, 2017, which claims the benefit of U.S. Provisional Application No. 62/296,154 filed Feb. 17, 2016 the disclosures of which are herein incorporated by reference in their entirety.

BACKGROUND

1. Field

The present invention relates to a wireless communication system and, more particularly, to a method and device for a base station to transmit information on a beam to a terminal in a communication system that performs beamforming.

2. Description of Related Art

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, implementation of the 5G communication system at a super-high frequency (mmWave) band (e.g., such as a 60 GHz band) is being considered. In order to obviate a propagation loss of a radio wave and increase a delivery distance of a radio wave at the super-high frequency band, discussions are underway about various techniques such as a beamforming, a massive MIMO, a full dimensional MIMO (FD-MIMO), an array antenna, an analog beam-forming, and a large scale antenna for the 5G communication system.

Additionally, for an improvement in the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like.

Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

Meanwhile, depending on the number of transmission beams, a base station may transmit a synchronization signal in different beam directions through respective symbols. A terminal that receives the synchronization signal through a beam with the greatest strength has a problem incapable of knowing which symbol is used to transmit the synchronization signal.

SUMMARY

In order to solve the above problem, the present invention provides a method and device in which a base station using a beamforming system transmits symbol index information corresponding to each of a plurality of symbols through which a synchronization signal is transmitted.

In addition, provided is a method of a base station to transmit information on a transmission beam to a terminal.

According to an embodiment of the present invention, a method of a base station in a wireless communication system may comprise generating a first synchronization signal, identifying symbol index information on a plurality of symbols transmitted through beams of different directions, and transmitting the first synchronization signal and the symbol index information in each of the plurality of symbols.

In addition, the symbol index information may be configured based on at least one bit and be transmitted through a physical broadcast channel (PBCH).

Meanwhile, the symbol index information may be a second synchronization signal configured to distinguish the plurality of symbols, based on a predetermined sequence.

In addition, the second synchronization signal may be an extended synchronization signal (ESS) generated based on a zadoff-chu sequence, and the first synchronization signal may be a primary synchronization signal (PSS).

Meanwhile, a base station in a wireless communication system may comprise a transceiver configured to transmit and receive signals, and a controller configured to generate a first synchronization signal, to identify symbol index information on a plurality of symbols transmitted through beams of different directions, and to control the transceiver to transmit the first synchronization signal and the symbol index information in each of the plurality of symbols.

In addition, the symbol index information may be configured based on at least one bit and be transmitted through a physical broadcast channel (PBCH).

Meanwhile, the symbol index information may be a second synchronization signal configured to distinguish the plurality of symbols, based on a predetermined sequence.

In addition, the second synchronization signal may be an extended synchronization signal (ESS) generated based on a zadoff-chu sequence, and the first synchronization signal may be a primary synchronization signal (PSS).

Meanwhile, a method of a terminal in a wireless communication system may comprise receiving a first synchronization signal and symbol index information in each of a plurality of symbols, and acquiring synchronization, based on the received first synchronization signal and the received symbol index information, wherein the symbol index information may be information corresponding to the plurality of symbols transmitted through beams of different directions.

In addition, the symbol index information may be configured based on at least one bit and be received through a physical broadcast channel (PBCH).

Meanwhile, the symbol index information may be a second synchronization signal configured to distinguish the plurality of symbols, based on a predetermined sequence, the second synchronization signal may be an extended synchronization signal (ESS) generated based on a zadoff-chu sequence, and the first synchronization signal may be a primary synchronization signal (PSS).

Meanwhile, a terminal in a wireless communication system may comprise a transceiver configured to transmit and receive signals, and a controller configured to control the transceiver to receive a first synchronization signal and symbol index information in each of a plurality of symbols, and to acquire synchronization, based on the received first synchronization signal and the received symbol index information, wherein the symbol index information may be information corresponding to the plurality of symbols transmitted through beams of different directions.

In addition, the symbol index information may be configured based on at least one bit and be received through a physical broadcast channel (PBCH).

Meanwhile, the symbol index information may be a second synchronization signal configured to distinguish the plurality of symbols, based on a predetermined sequence.

In addition, the second synchronization signal may be an extended synchronization signal (ESS) generated based on a zadoff-chu sequence, and the first synchronization signal may be a primary synchronization signal (PSS).

According to an embodiment of the present invention, a base station allows a terminal to easily know a symbol index of a received synchronization signal.

According to another embodiment of the present invention, a base station allows a terminal to easily identify a beam identifier of a subframe to be transmitted.

BRIEF DESCRIPTION OF THE DRAWINGS

FIG. 13 is a diagram illustrating types of RNTIs in a typical communication system, FIG. 15 is a diagram illustrating the number of decoding times of a terminal.

DETAILED DESCRIPTION

Figure 1:
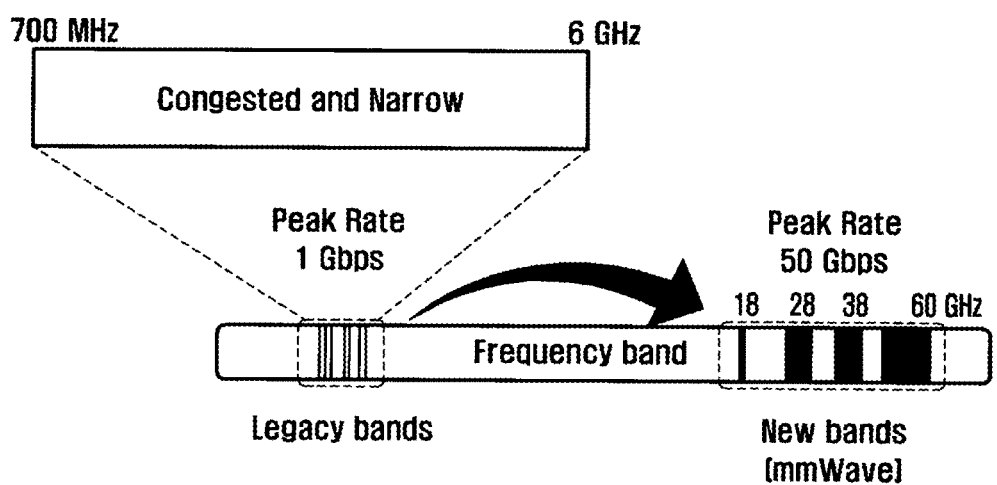
FIG. 1 is a diagram illustrating a legacy frequency band and a super-high frequency (mm Wave) band.

Hereinafter, embodiments of the present invention will be described with reference to the accompanying drawings.

In the following description of embodiments, descriptions of techniques that are well known in the art and not directly related to the present invention are omitted. This is to clearly convey the subject matter of the present invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below and with reference to the accompanying drawings. The present invention may, however, be embodied in many different forms and should not be construed as being limited to the embodiments set forth herein. Rather, these embodiments are provided so that this invention will be thorough and complete and will fully convey the scope of the invention to those skilled in the art. To fully disclose the scope of the invention to those skilled in the art, the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In the present invention, a terminal may include in general a mobile terminal and indicate a device subscribed to a mobile communication system to receive a service from the mobile communication system. The mobile terminal may include a smart device such as a smart phone or a tablet PC. This is, however, exemplary only, and the present invention is not limited thereto.

FIG. 1 is a diagram illustrating a legacy frequency band and a super-high frequency (mmWave) band.

As mobile traffic increases, there is a growing need to secure new frequency bands. Accordingly, as shown in FIG. 1, studies are being made on the mmWave frequency bands which can utilize a wideband frequency of several GHz.

For example, studies are underway on a 60 GHz frequency band and various frequency candidates such as 15 GHz, 28 GHz, 38 GHz, 44 GHz, and 70 GHz for the new generation (NG) mobile 5G communication standard.

The mmWave frequency band has greater path attenuation than the existing frequency band. However, because of the short-wavelength characteristics of radio waves, the use of the mmWave frequency band allows a device to apply a beamforming technique through an antenna array in a given physical space. Thus, by performing communication using the mmWave frequency band, the device may increase an antenna gain and ensure a link budget necessary for wireless communication. Therefore, the beamforming technique is necessary for long-distance communication in the super-high frequency band.

Figure 2:
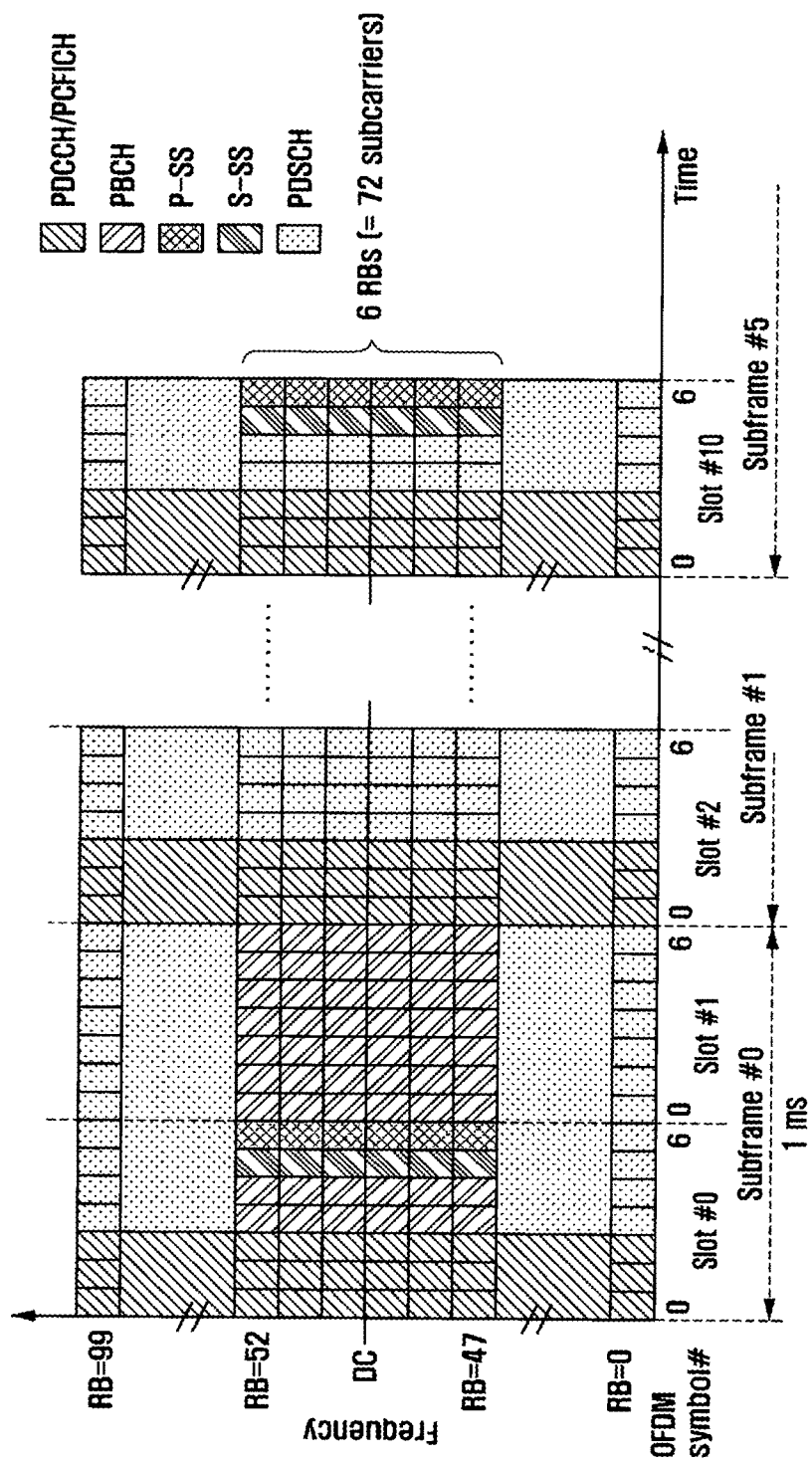
FIG. 2 is a diagram illustrating a synchronization signal transmitted in a typical communication system (e.g., an LTE communication system)

In a typical communication system (e.g., the LTE communication system), a base station may transmit a synchronization signal as shown in FIG. 2 for synchronization between the base station and a terminal. For example, the base station may transmit a primary synchronization signal (PSS) and a secondary synchronization signal (SSS) twice at specific positions (e.g., subframes #0 and #5) in a subframe.

The terminal may acquire a sector ID of the base station from the PSS and acquire a group ID from the SSS. Therefore, the terminal may acquire the entire physical cell ID.

In addition, the terminal may acquire time-axis synchronization within a half frame. The half frame may include five subframes.

Meanwhile, the SSS may be transmitted by interleaving m0 and m1 signals constituting an m-sequence therein. At this time, the base station may transmit the m-sequence of the SSS in the order of m0 and m1 or vice versa such that two half frames, e.g., subframes #0 and #5, can be distinguished from each other.

In case of the typical communication system such LTE, the existing legacy frequency band of several GHz is used, and the base station may transmit and receive signals through an omni-antenna which has no directionality. Thus, the base station may transmit and receive signals of sufficient strength to and from users in a network As described above, the base station of the typical communication system may transmit the synchronization signals PSS and SSS at specific positions as shown in FIG. 2. Therefore, the terminal may determine the position in the half frame by using the received PSS and SSS and thereby synchronize with the base station.

However, the communication system using the super-high frequency band may need the beamforming technique to secure the link budget because of excessive path attenuation. Therefore, in the super-high frequency band, in order to transmit a synchronization signal to a plurality of terminals in the network, the base station needs to transmit a transmission beam repeatedly while changing a transmission direction.

Figure 3:
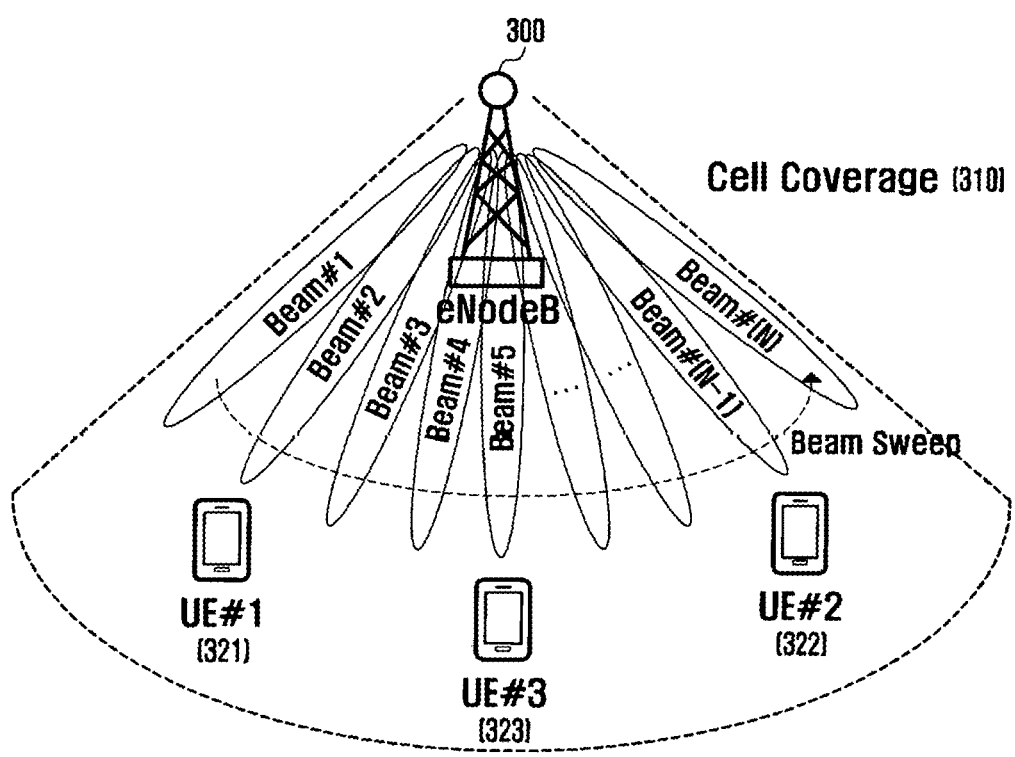
FIG. 3 is a diagram illustrating a beam sweeping operation in which a base station repeatedly transmits a transmission beam in a super-high frequency band while changing a transmission direction.

Specifically, when there are the first to third terminals (UEs) 321, 322 and 323 in the cell coverage 310 of the base station (eNodeB or eNB) 300 as shown in FIG. 3, the base station 300 may transmit the same synchronization signal several times while performing beam sweeping.

Figure 4A:
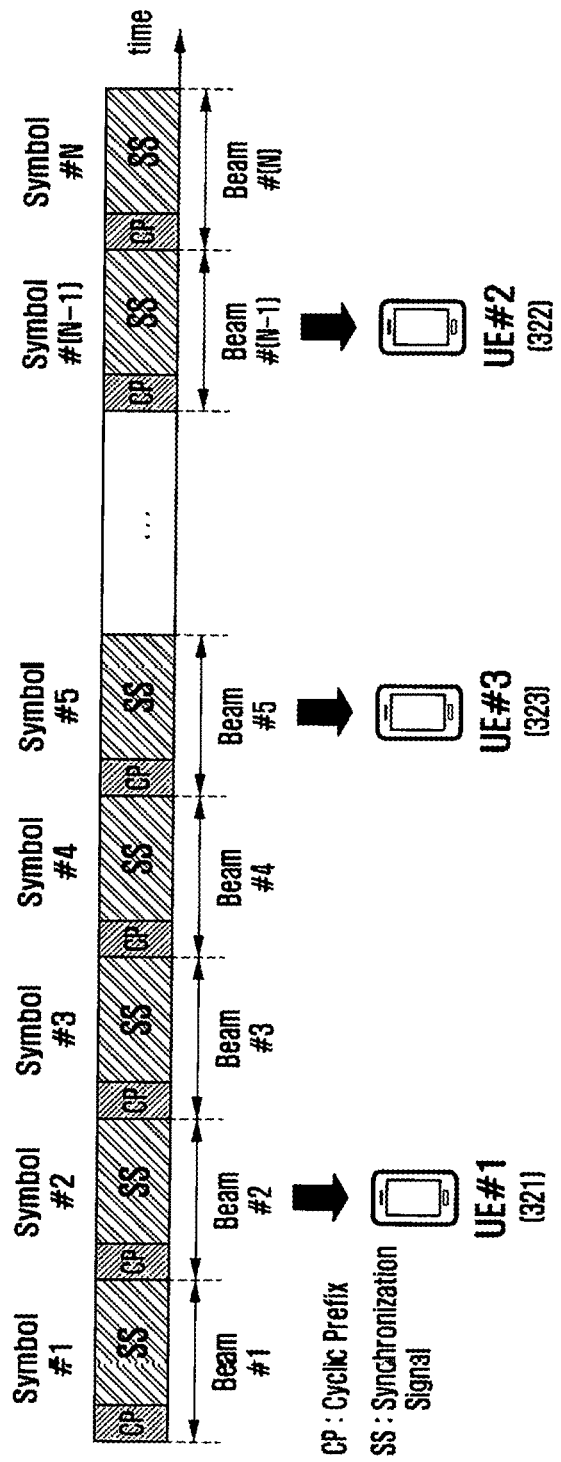
FIGS. 4A and 4B are diagrams illustrating a process of a base station that transmits a synchronization signal to a plurality of terminals.
Figure 4B:
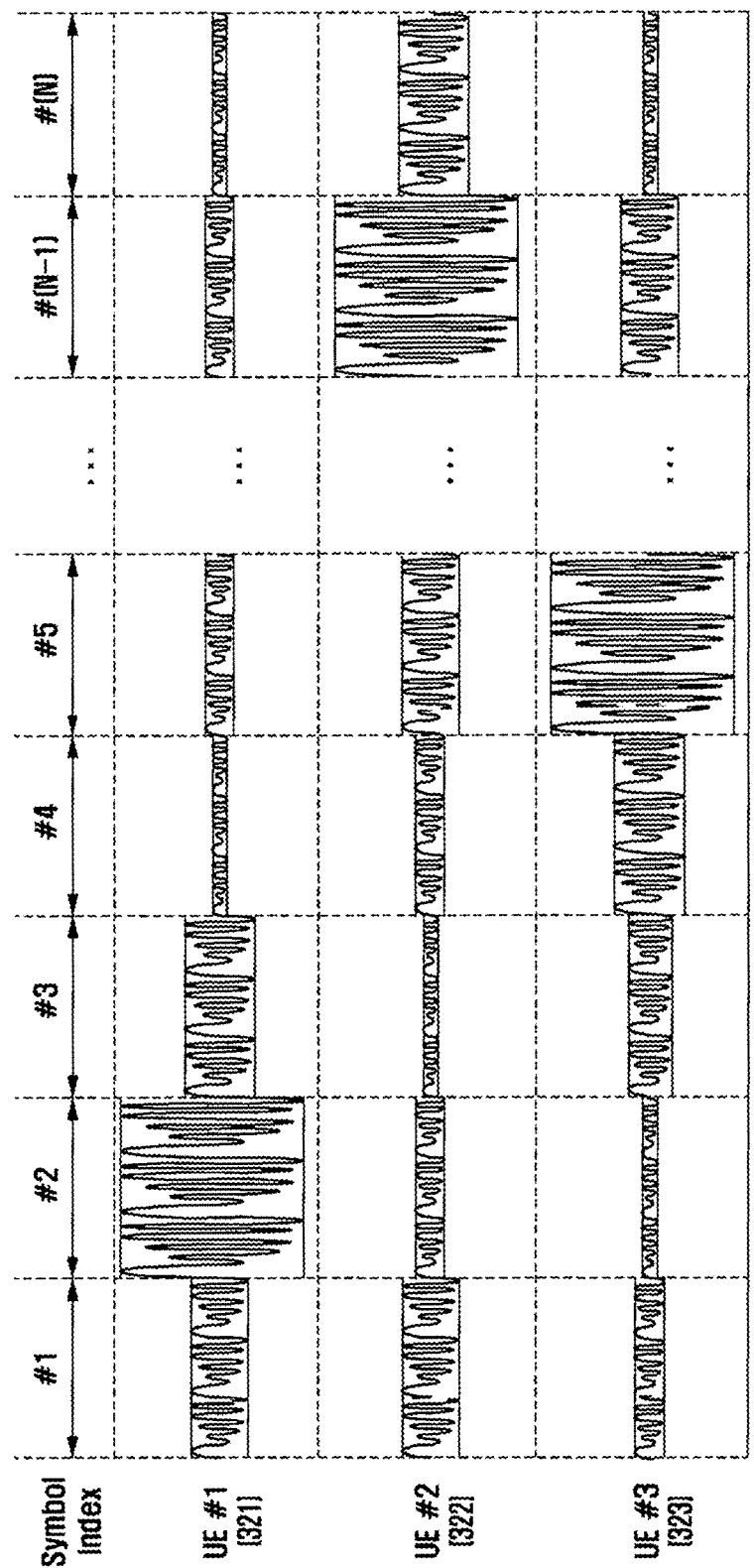

FIGS. 4A and 4B are diagrams each illustrating a process in which the base station 300 as described in FIG. 3 transmits the synchronization signal to the first to third terminals 321, 322 and 323.

As described above, when the base station transmits the synchronization signal by using a plurality of symbols while performing the beam sweep, each of the terminals may acquire the synchronization signal through an arbitrary symbol among the plurality of symbols, depending on a location thereof.

As shown in FIG. 4A, the base station 300 may transmit the synchronization signal while performing the beam sweep for respective symbols according to the number of transmission beams possessed by the base station 300. Each of the terminals may receive, as a signal having high strength, only the synchronization signal a beam direction of which is coincident with the location of the terminal.

For example, if the number of transmission beams possessed by the base station 300 is n, the base station 300 may perform beam sweeping through n symbols. In this case, the first terminal 321 may receive the synchronization signal transmitted through the second symbol, with the highest strength, among synchronization signals transmitted through the plurality of symbols. Also, the second terminal 322 may receive the synchronization signal transmitted through the (n−1)th symbol with the greatest strength. And also, the third terminal 323 may receive the synchronization signal transmitted through the fifth symbol with the greatest strength.

The terminal may receive relatively weakly a signal transmitted in a beam direction which does not coincide with a beam direction according to the location of the terminal. If the terminal receives the synchronization signal with the reception gain fixed after the direction of a reception beam is fixed to the base station direction, the waveforms of signals received by the first to third terminals 321, 322 and 323 may be as shown in FIG. 4B.

If the base station repeatedly transmits only the same PSS and SSS for every symbol as in the typical communication system such as LTE, the terminal fails to know, at the initial access, which symbol has been used to transmit the received synchronization signal. Therefore, even if the terminal detects the synchronization signal, the terminal may not determine the position in time on a frame structure.

For example, in FIG. 4B, the first terminal 321 fails to know whether the received synchronization signal is the second symbol, the second terminal 322 fails to know whether the received synchronization signal is the (n−1)th symbol, and the third terminal 323 fails to know whether the received synchronization signal is the fifth symbol.

Therefore, the terminals may not perform the time-axis synchronization on a symbol basis.

In order to solve the above problem, the first embodiment of the present invention proposes a method of transmitting an indicator or signal for indicating a symbol index through which the synchronization signal is transmitted, in addition to repeatedly transmitting the synchronization signal. According to the first embodiment, the terminal can accomplish the time-axis synchronization on the frame.

Figure 5:
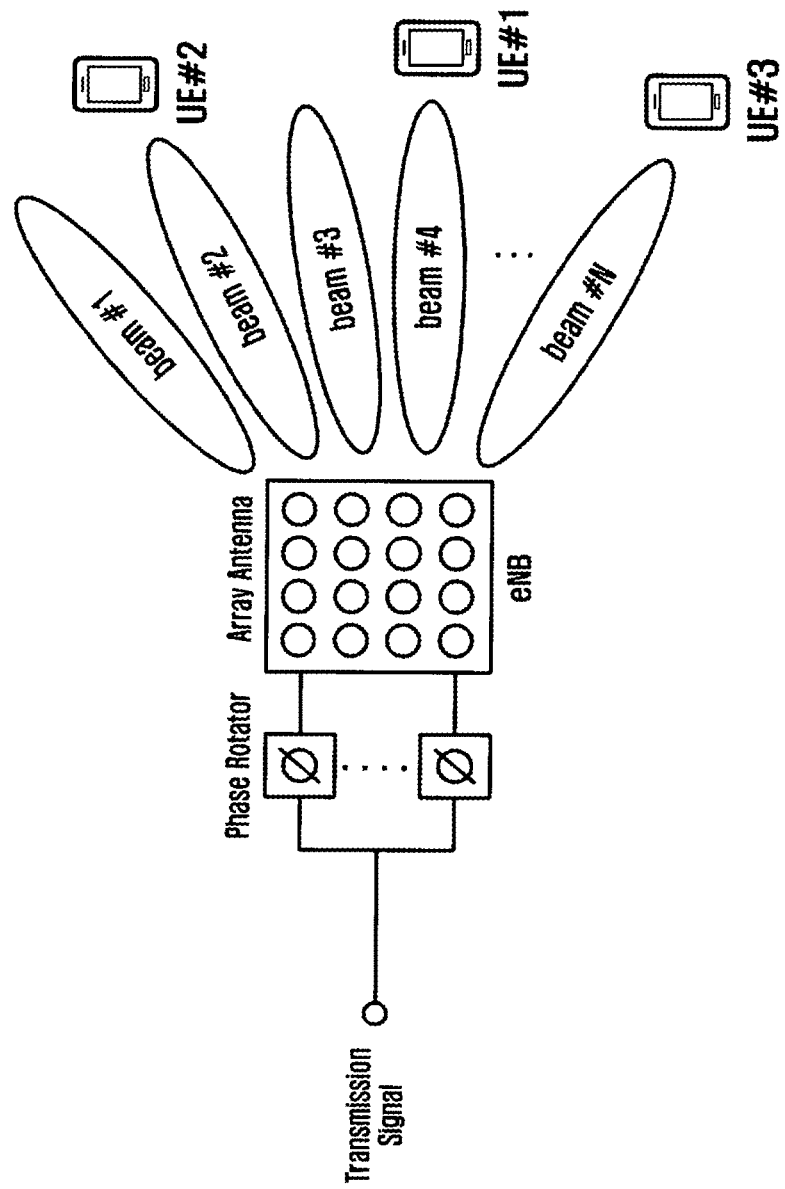
FIG. 5 is a diagram illustrating a communication system in which a base station transmits a signal to a terminal by using a beamforming technique.

First, FIG. 5 is a diagram illustrating a communication system in which a base station (eNB) transmits a signal to terminals (UEs) by using a beamforming technique. Because the path attenuation is significant when the long-distance communication is performed in the super-high frequency band as described above, the beamforming technique may be used to overcome the path attenuation. Thus, the base station may perform a phase rotation for an RF signal to be transmitted and send it to antenna elements of an array antenna. Then the base station may generate a beam in a desired direction according to the sum of phase shift signals of the antenna elements and thereby transmit a signal.

Therefore, when the direction of the transmission beam of the base station is coincident with the location of the terminal, the signal may be transmitted with sufficient strength because the equivalent isotropically radiated power (EIRP) by the transmission antenna gain is increased. On the other hand, if the beam direction does not coincide, the signal may be transmitted weakly.

In addition, the base station may transmit the synchronization signal to the terminal at a predetermined position in the frame standard. For example, the terminal may maintain synchronization with the base station by using the synchronization signal transmitted at an arbitrary position on the frame. However, because of the above-described beamforming, the terminal may not receive the synchronization signal with sufficient strength, depending on locations thereof.

Figure 6:
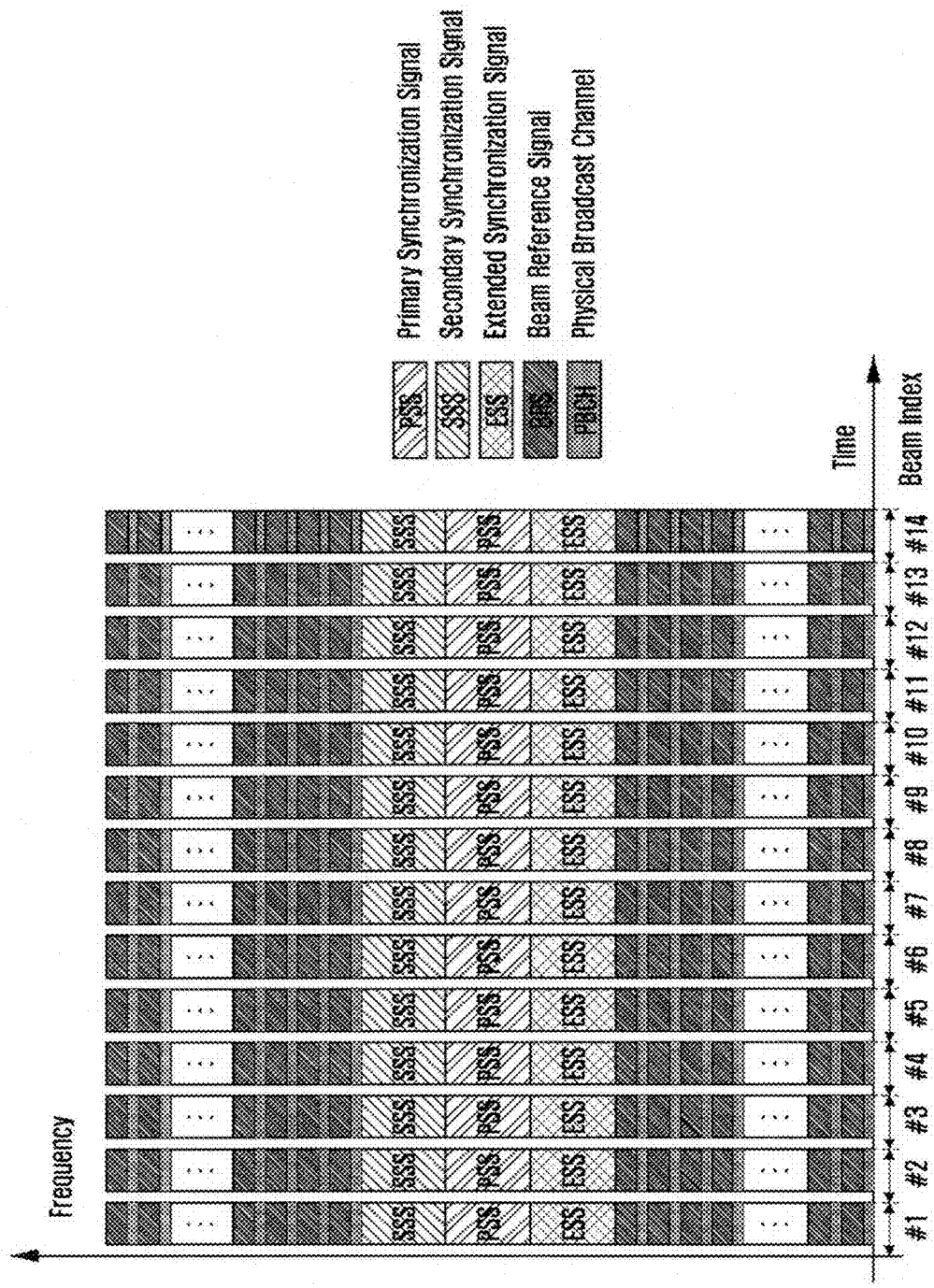
FIG. 6 is a diagram illustrating that a base station transmits a beam in various directions in a certain section on a frame for the same synchronization signal.

All the terminals located within a certain radius from the base station should receive the synchronization signal of sufficient strength. For this, as shown in FIG. 6, the base station needs to transmit the same synchronization signal while changing the beam in various directions in an arbitrary section on the frame.

At this time, in addition to the synchronization signal, additional information that needs to be transmitted during a beam sweep interval may be transmitted simultaneously. For example, through frequency division multiplexing (FDM), the base station may simultaneously transmit additional information such as a physical broadcasting channel (PBCH), which is information that needs to be transmitted to all users, and a beam reference signal (BRS) for the optimum beam measurement.

In addition, the base station may transmit a symbol index necessary for the time-axis synchronization of the beamforming system by adding an extended synchronization signal (ESS), which is a new synchronous signal, to an arbitrary position in the frame.

The ESS may be a signal transmitted so that the terminal finds the start and end points of a subframe. For example, using different sequences for respective OFDM symbols, the ESS may be used to determine the subframe boundary by indicating which beam is detected by the terminal (i.e., which symbol is used for transmission of the beam).

FIG. 6 shows one embodiment in which the same signal is transmitted for each symbol by means of the beam sweep. Alternatively, in another embodiment, the same signal may be transmitted through two or more symbols by means of the beam sweep.

According to an embodiment of the present invention, the base station may transmit the symbol index by allocating an additional information bit to the PBCH signal without transmitting the ESS, unlike the case shown in FIG. 6.

Specifically, the base station may allocate a certain information bit to a signal transmitted through the PBCH, thereby indicating which symbol in the subframe is used to transmit the synchronous signal.

According to an embodiment, the base station may allocate four bits to a signal transmitted through the PBCH. For example, in case of transmitting the synchronization signal in different directions while performing the beam sweep through fourteen symbols, the base station may use the four bits to indicate which symbol is used for transmission of the synchronization signal.

Specifically, in case of equally transmitting the synchronization signal through the first to fourteenth symbols, the base station may allocate four information bits '0000' to the PBCH transmitted through the first symbol and transmit them together with the synchronization signal. Also, the base station may allocate four information bits '0001' to the PBCH transmitted through the second symbol and transmit them together with the synchronization signal.

Alternatively, the base station may allocate such information bits in a bitmap format. For example, the base station may allocate fourteen information bits to the PBCH and set the information bits of the PBCH, transmitted through the first symbol, to '100000000000' and transmit them together with the synchronization signal. In addition, the base station may set the information bits of the PBCH, transmitted through the sixth symbol, to '000001000000' and transmit them together with the synchronization signal.

The terminal that receives the information bits through the PBCH may check the validity of information in a process of cyclic redundancy check (CRC) after PBCH channel decoding. Therefore, the terminal may acquire a more reliable symbol index. In addition, because the existing PBCH decoder can be utilized, the terminal does not need additional hardware.

Meanwhile, the above-described allocation of four or fourteen information bits is merely exemplary. Any information bit allocation technique that allows the symbols used for transmission of the same synchronization to be distinguished from each other may be applied.

According to another embodiment of the present invention, the base station may indicate a symbol index for transmission of the synchronization signal by transmitting the synchronization signal including the above-mentioned ESS and having a form as shown in FIG. 6.

In general, the zadoff-chu sequence has a constant amplitude zero autocorrelation (CAZAC) characteristic. Thus, a cross-correlation value between any zadoff-chu sequence and a circularly shifted sequence there becomes zero. For example, if the zadoff-chu sequence of length 63 is '0, 1, 2, . . . , 62', the cross-correlation value between the zadoff-chu sequence and a circularly shifted sequence thereof, '59, 60, 61, 62, 0, 1, . . . , 58', becomes zero.

Therefore, according to an embodiment of the present invention, the zadoff-chu sequence used generally in the PSS may be circularly shifted by a value predetermined depending on the symbol index and then be disposed at a specific frequency position.

Figure 7:
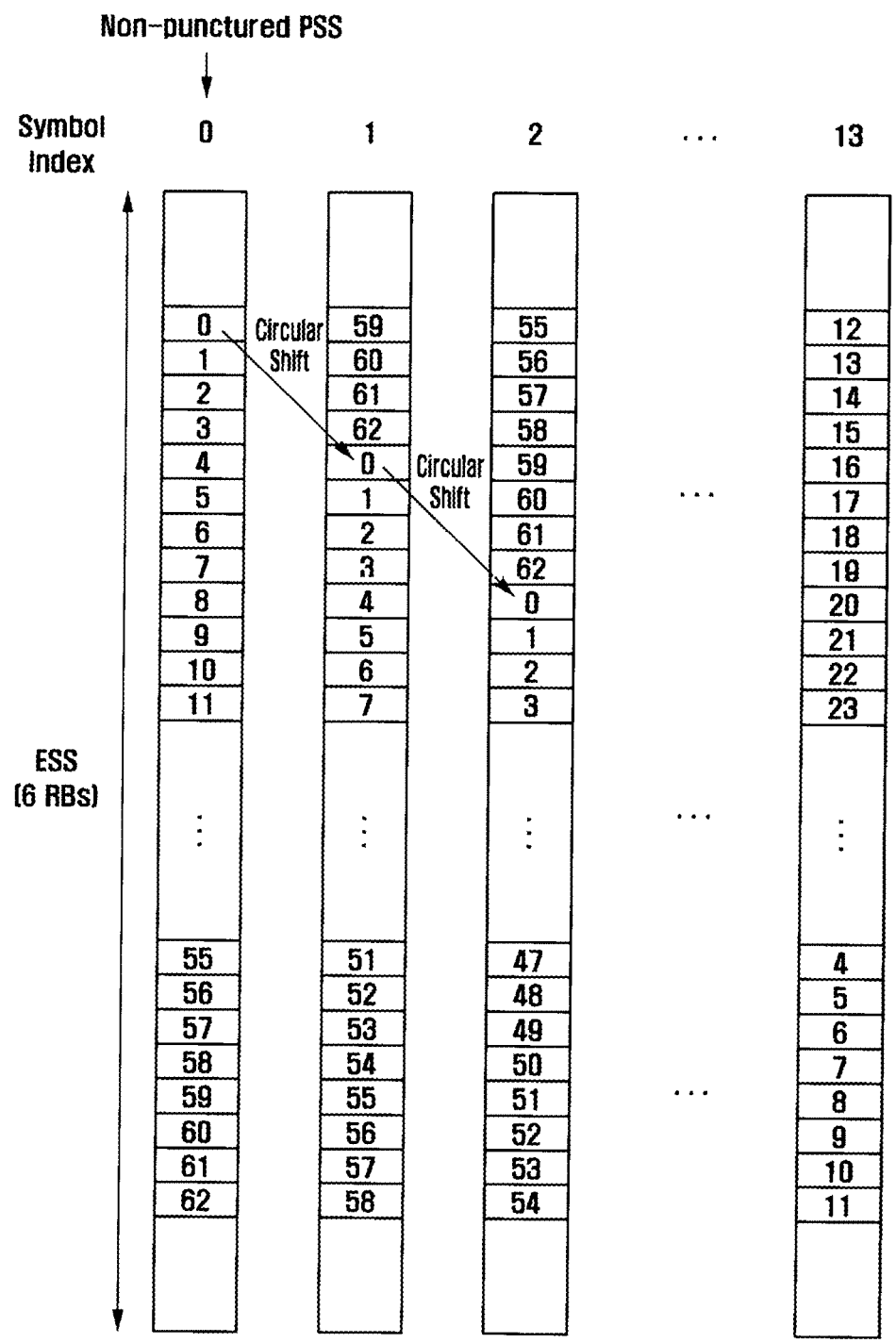
FIG. 7 is a diagram illustrating an ESS per symbol index circularly shifted based on a zadoff-chu sequence.

FIG. 7 is a diagram illustrating an ESS per symbol index circularly shifted based on a zadoff-chu sequence. As shown in FIG. 7, the original zadoff-chu sequence including a signal punctured corresponding to the ground position in the PSS may be used as it is.

FIG. 7 shows a scheme in which the zadoff-chu sequence is circularly shifted at regular intervals on the frequency axis according to the symbol index. In case of forming signals circularly shifted at four subcarrier intervals from a signal having a length of 63, it is possible to acquire fourteen signals circularly shifted using one zadoff-chu sequence. Therefore, using the ESS as shown in FIG. 7, the base station may distinguish fourteen symbols in one subframe. This is, however, merely exemplary, and there may be various mapping relations between the circular shift and the symbol index. Any scheme capable of distinguishing symbols for transmission of the same synchronization signal may be applicable regardless of a mapping relation between the circular shift and the symbol index.

Compared to the scheme of selecting fourteen sequences from the m-sequence used in the SSS and transmitting them as the ESS, the circular shift scheme of the zadoff-chu sequence such as the PSS may have the effect of improving performance at least 1 dB or more.

FIGS. 8A to 8D are diagrams illustrating, in a single cell environment, performance measured using arbitrary fourteen candidate sets through a circular shift of a zadoff-chu sequence used in a PSS and performance measured using the best fourteen candidate sets among 168 m-sequences used in an SSS.

Figure 8A:
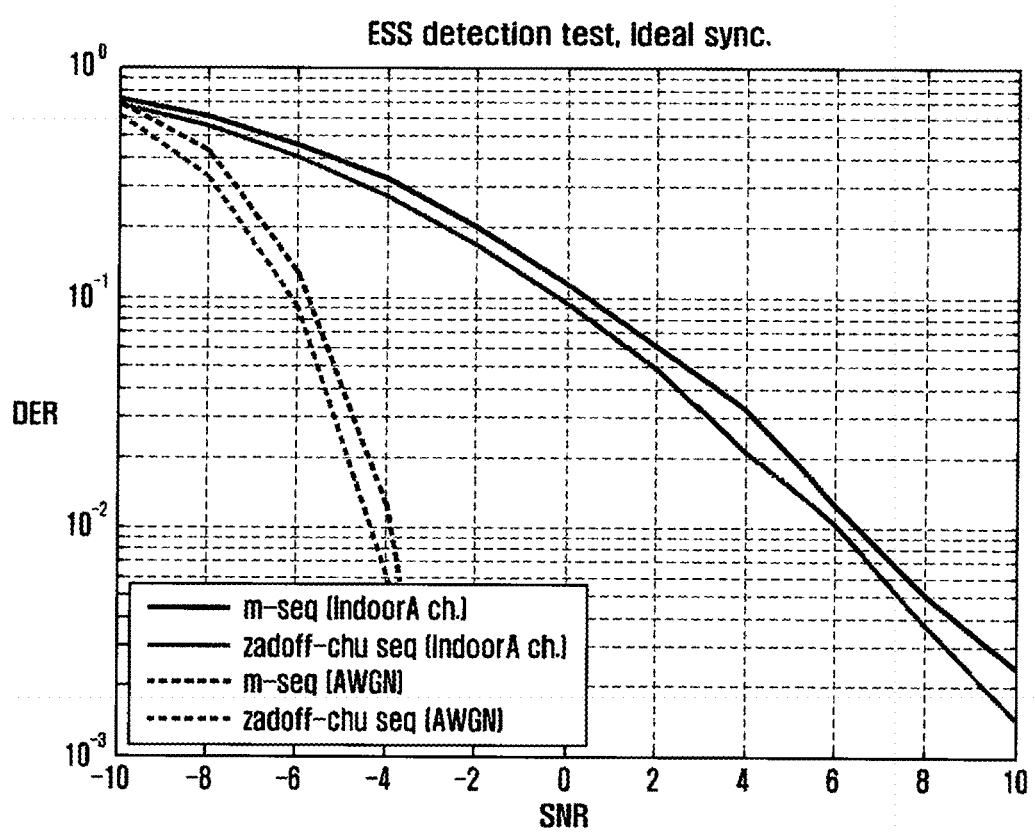
FIGS. 8A to 8D are diagrams illustrating, in a single cell environment, performance measured using arbitrary fourteen candidate sets through a circular shift of a zadoff-chu sequence used in a PSS and performance measured using the best fourteen candidate sets among 168 m-sequences used in an SSS.

FIG. 8A shows a result of comparing performance in an ideal synchronization state. The ideal synchronization state may be a case where the frequency offset is zero.

Figure 8B:
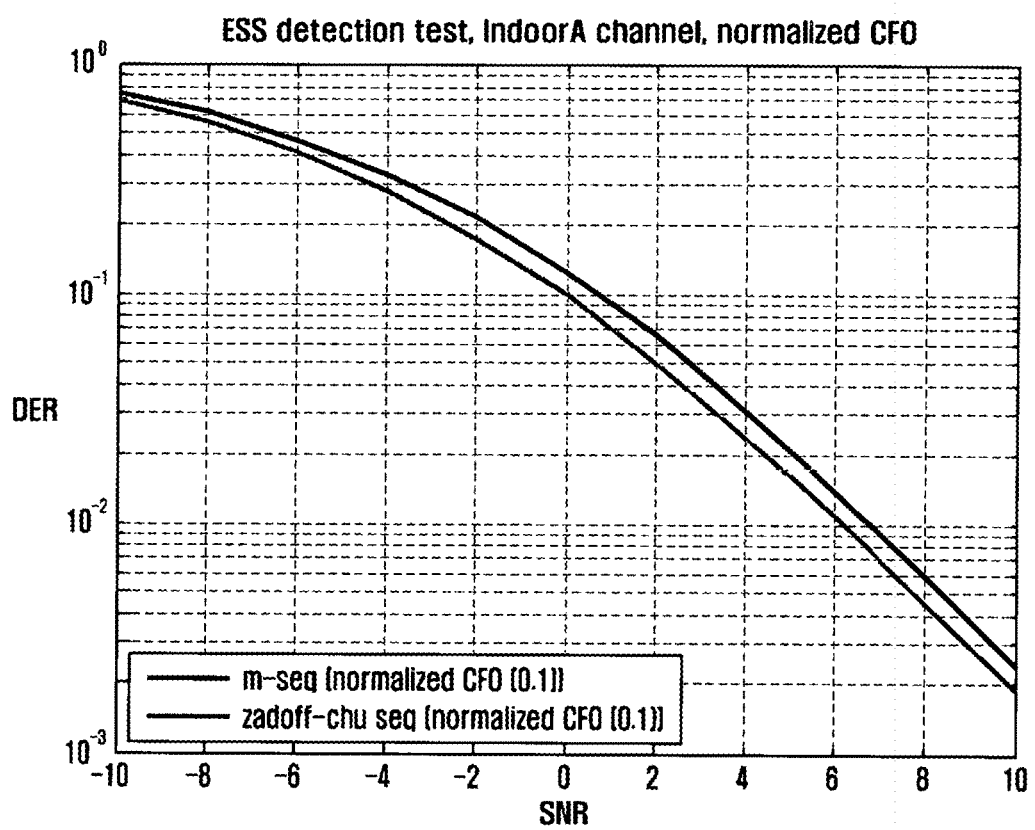

FIG. 8B shows a result of comparing performance in a frequency offset state of about 10% in comparison with the subcarrier spacing.

Figure 8C:
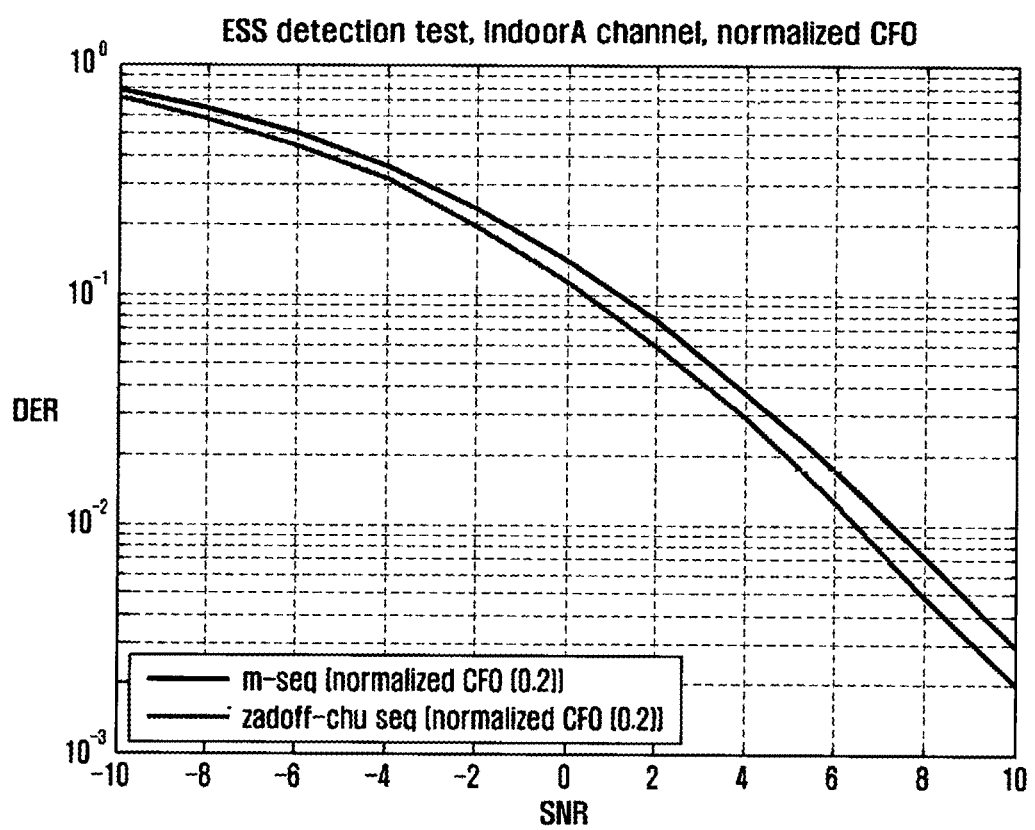

FIG. 8C shows a result of comparing performance in a frequency offset state of about 20% in comparison with the subcarrier spacing.

Figure 8D:
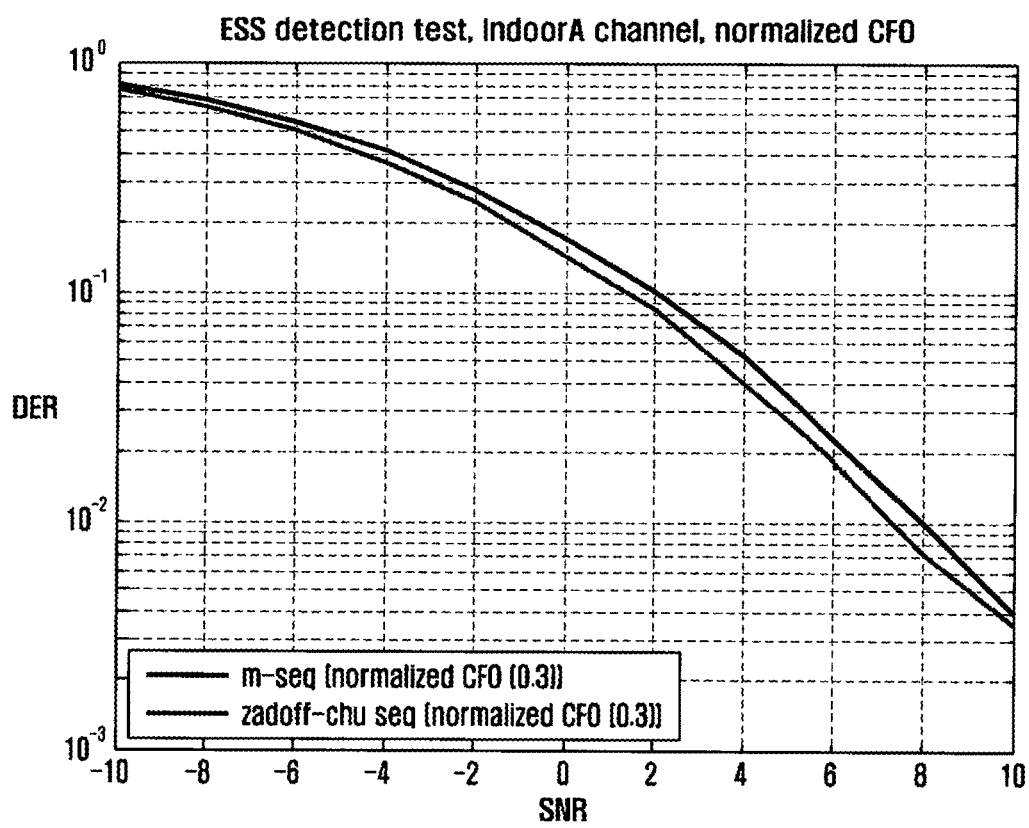

FIG. 8D shows a result of comparing performance in a frequency offset state of about 30% in comparison with the subcarrier spacing.

Figure 9:
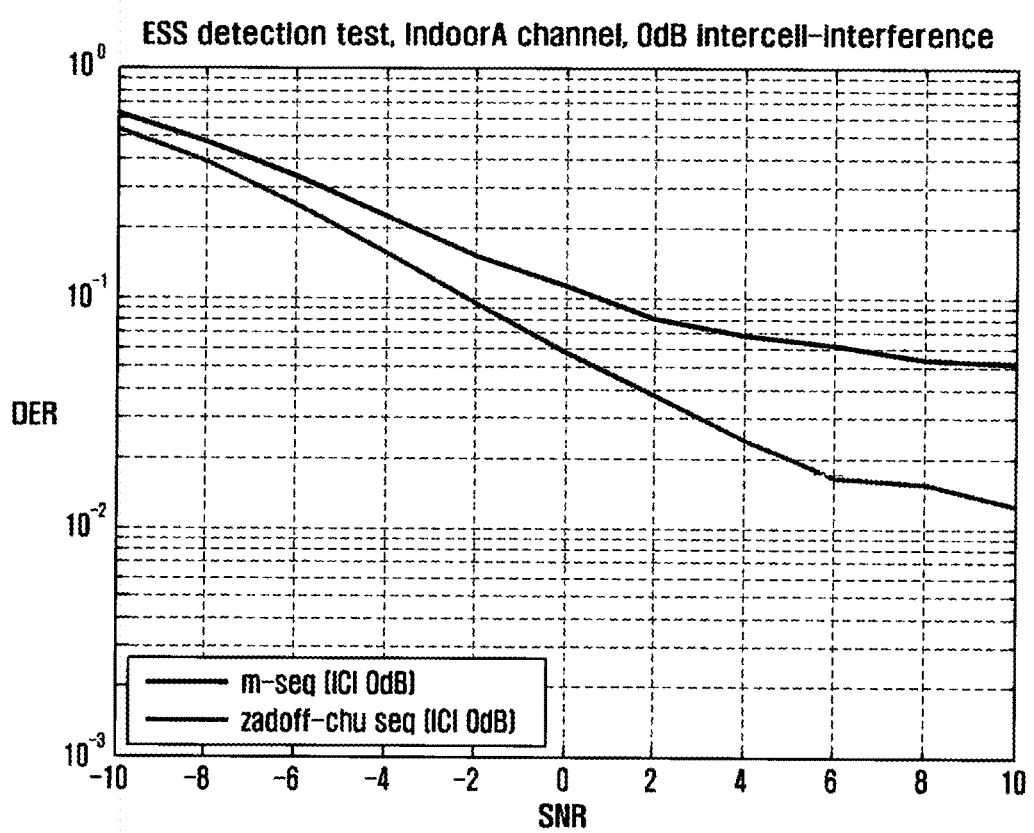
FIG. 9 is a diagram illustrating, in a multi cell environment, performance measured using arbitrary fourteen candidate sets through a circular shift of a zadoff-chu sequence used in a PSS and performance measured using the best fourteen candidate sets among 168 m-sequences used in an SSS.

On the other hand, FIG. 9 is a diagram illustrating, in a multi cell environment, performance measured using arbitrary fourteen candidate sets through a circular shift of a zadoff-chu sequence used in a PSS and performance measured using the best fourteen candidate sets among 168 m-sequences used in an SSS.

In the multi-cell environment, there is an additional effect of improving performance by a difference of the zadoff-chu sequence as shown in FIG. 9, so that a large performance gain may be obtained in comparison with the m-sequence.

Figure 10:
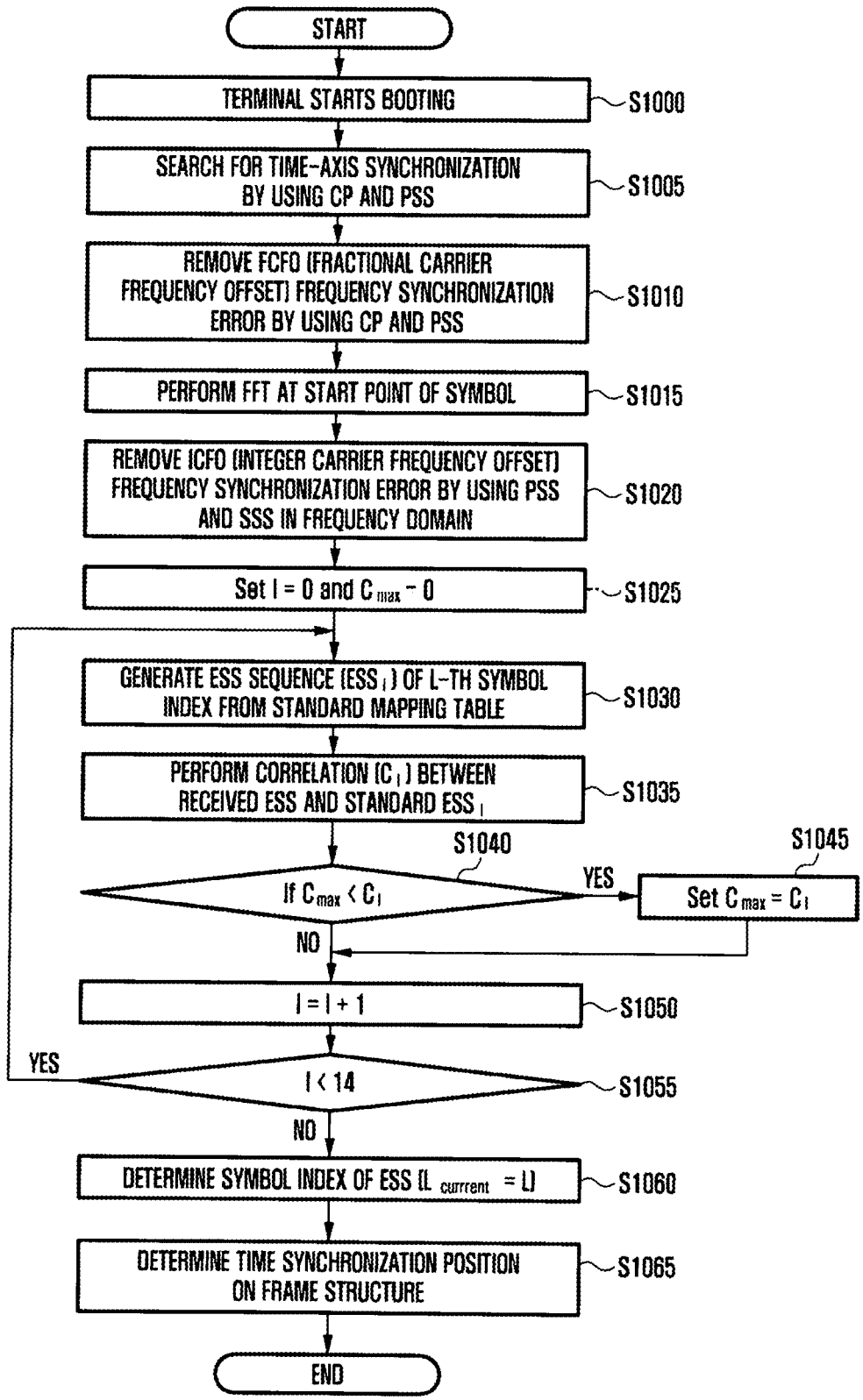
FIG. 10 is a flow diagram illustrating a process of acquiring synchronization when a terminal initially accesses a base station according to an embodiment of the present invention.

Meanwhile, FIG. 10 is a flow diagram illustrating a process of acquiring synchronization when a terminal initially accesses a base station according to an embodiment of the present invention.

First, when the terminal starts booting at step S1000, the terminal may search for the time-axis synchronization at step S1005 by using a cyclic prefix (CP) and the PSS transmitted by the base station.

The terminal may search for a time synchronization position by using the CP and the PSS, and may remove a frequency error due to an oscillator deviation. In order to remove the frequency error, a sequential process of removing a fractional carrier frequency offset (FCFO) by using the CP and the PSS and then removing an integer carrier frequency offset (ICFO) by using the PSS and the SSS on the frequency axis after FFT may be used.

Specifically, at step S1010, the terminal may remove an FCFO frequency synchronization error by using the CP and PSS. Then, at step S1015, the terminal may perform fast fourier transform (FFT) at a start point of a symbol.

At step S1020, the terminal may remove an ICFO frequency synchronization error by using the PSS and the SSS in the frequency domain.

After the frequency error is removed, the terminal may perform correlation on all candidate sets for the ESS, and determine the symbol index by finding the greatest peak value according to the result of the correlation.

Specifically, at step S1025, the terminal may set l and $C_{max}$ values to zero. Then, at step S1030, the terminal may generate an ESS sequence ($ESS_l$) of the l-th symbol index from a mapping table in the standard.

As described above with reference to FIG. 7, the mapping table between the symbol index and the circular shift of the zadoff-chu sequence for the ESS may be shared in advance by the base station and the terminal. Therefore, the terminal may generate an ESS sequence ($ESS_0$) of the 0th symbol index from the mapping table.

At step S1035, the terminal may perform correlation ($C_l$) between the received ESS and the standard $ESS_l$. For example, the terminal may generate a $C_0$ value by performing correlation between the received ESS and the $ESS_0$.

At step S1040, the terminal may determine whether the $C_{max}$ value is smaller than a $C_l$ value for which the correlation is performed. For example, the terminal may determine whether the $C_{max}$ value is smaller than the $C_0$ value for which the correlation is performed.

If it is determined that the $C_{max}$ value is smaller than the $C_l$ value for which the correlation is performed, the terminal may set the $C_{max}$ value to the $C_l$ value at step S1045. For example, if the $C_{max}$ value is smaller than the $C_0$ value for which the correlation is performed, the terminal may set the $C_{max}$ value to the $C_0$ value.

Then, at step S1050, the l value may be changed to a value of 'l+1'. For example, the l value may be 1 at step S1050.

On the other hand, if it is determined at step S1040 that the $C_{max}$ value is not smaller than the $C_1$ value for which the correlation is performed, the terminal may change the l value to the 'l+1' value immediately at step S1050 without changing the $C_{max}$ value.

If the changed l value is smaller than 14 at step S1055, the process may be repeated from step S1030. Specifically, the terminal may generate an ESS sequence ($ESS_1$) of the first symbol index from the mapping table. Then the terminal may perform correlation ($C_1$) between the received ESS and the standard $ESS_1$, and determine whether the $C_{max}$ value is smaller than a $C_1$ value for which the correlation is performed. If it is determined that the $C_{max}$ value is not smaller than the $C_1$ value for which the correlation is performed, the terminal may change the l value to the 'l+1' value. If the changed l value is smaller than 14, the process may be repeated from step S1030. For example, the terminal may change the l value to 2 and repeat the process from step S1030.

At step S1060, if the correlation is performed for all fourteen symbols by the above-described operation, the terminal may determine the symbol index of the ESS. Then, at step S1065, the terminal may determine the time synchronization position on the frame structure. For example, the terminal may determine a symbol index having the greatest peak value as a result of correlation. Then, based on the determined symbol index, the terminal may determine the time synchronization position with the base station.

Meanwhile, once acquiring the symbol index initially, the terminal may perform the correlation only for a sequence corresponding to the symbol index acquired in the previous subframe. Then, if a value for which the correlation is performed exceeds a predetermined threshold value, the terminal may determine that the symbol index determined in the previous subframe is still valid. That is, only when the value for which the correlation is performed does not exceed the predetermined threshold value, the terminal may perform the correlation for all candidate sets of the ESS by using the above-described method in FIG. 10.

Let's suppose that the terminal acquires 2 as the symbol index by performing the correlation with respect to all candidate sets of the ESS. After acquiring the symbol index 2, the terminal may generate an ESS sequence having the symbol index 2 and perform the correlation with the received ESS in the next subframe. Then the terminal may check whether a value for which the correlation is performed exceeds a threshold value. If so, the terminal may maintain the symbol index 2 in the corresponding subframe.

Figure 11:
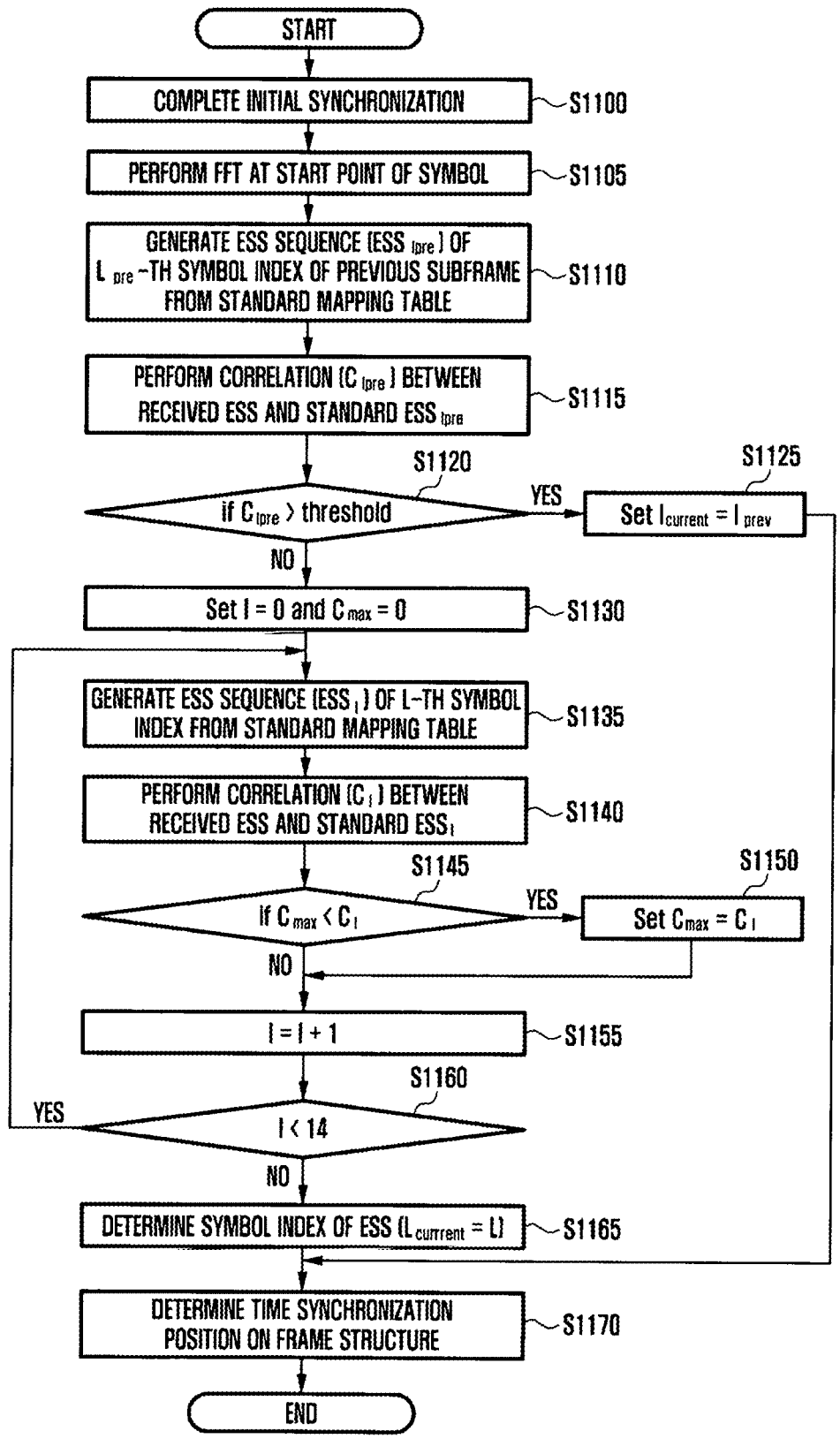
FIG. 11 is a flow diagram illustrating a method for a terminal to determine a symbol index for low power consumption after the terminal initially accesses a base station.

By performing the correlation only for the sequence corresponding to the symbol index acquired in the previous subframe, the terminal may reduce power consumption. For example, by implementing hardware based on the above method, the terminal may reduce the power consumed in the ESS detection to about 1/14. Hereinafter, with reference to FIG. 11, a method for the terminal to reduce the power consumed in the ESS detection will be described in detail.

First, when the initial synchronization is completed at step S1100, the terminal may perform the FFT at a start point of a symbol at step S1105.

At step S1110, the terminal may generate an ESS sequence ($ESS_{l_{pre}}$) of the $l_{pre}$-th symbol index of the previous subframe from a mapping table in the standard.

As described above with reference to FIG. 7, the mapping table between the symbol index and the circular shift of the zadoff-chu sequence for the ESS may be shared in advance by the base station and the terminal. Therefore, from the mapping table, the terminal may generate the ESS sequence ($ESS_{l_{pre}}$) of the symbol index determined in the previous subframe. For example, if the symbol index is determined to be 6 in the previous subframe, the terminal may generate an $ESS_6$.

At step S1115, the terminal may perform correlation ($C_{l_{pre}}$) between the received ESS and the standard $ESS_{l_{pre}}$. For example, the terminal may generate a $C_6$ value by performing correlation between the received ESS and the generated $ESS_6$.

At step S1120, the terminal may determine whether a $C_{l_{pre}}$ value exceeds a predetermined threshold value. If it is determined that the $C_{l_{pre}}$ value exceeds the predetermined threshold value, the terminal may determine at step S1125 that the symbol index for the current subframe is equal to the symbol index for the previous subframe. For example, if the symbol index is 6 in the previous subframe, the terminal may determine the symbol index for the current subframe to be 6.

On the other hand, if it is determined that the $C_{l_{pre}}$ value does not exceed the predetermined threshold value, the terminal may perform the correlation with respect to all candidate sets of the ESS from step S1130 by the same method as described above in FIG. 10.

Specifically, at step S1130, the terminal may set l and $C_{max}$ values to zero. Then, at step S1135, the terminal may generate an ESS sequence ($ESS_1$) of the l-th symbol index from a mapping table in the standard.

As described above with reference to FIG. 7, the mapping table between the symbol index and the circular shift of the zadoff-chu sequence for the ESS may be shared in advance by the base station and the terminal. Therefore, the terminal may generate an ESS sequence ($ESS_0$) of the 0th symbol index from the mapping table.

At step S1140, the terminal may perform correlation ($C_1$) between the received ESS and the standard $ESS_1$. For example, the terminal may generate a $C_0$ value by performing correlation between the received ESS and the $ESS_0$.

At step S1145, the terminal may determine whether the $C_{max}$ value is smaller than a $C_1$ value for which the correlation is performed. For example, the terminal may determine whether the $C_{max}$ value is smaller than the $C_0$ value for which the correlation is performed.

If it is determined that the $C_{max}$ value is smaller than the $C_1$ value for which the correlation is performed, the terminal may set the $C_{max}$ value to the $C_1$ value at step S1150. For example, if the $C_{max}$ value is smaller than the $C_0$ value for which the correlation is performed, the terminal may set the $C_{max}$ value to the $C_0$ value.

Then, at step S1155, the l value may be changed to a value of 'l+1'. For example, the l value may be 1 at step S1155.

On the other hand, if it is determined at step S1145 that the $C_{max}$ value is not smaller than the $C_1$ value for which the correlation is performed, the terminal may change the l value to the 'l+1' value immediately at step S1155 without changing the $C_{max}$ value.

If the changed l value is smaller than 14 at step S1160, the process may be repeated from step S1135. Specifically, the terminal may generate an ESS sequence ($ESS_1$) of the first symbol index from the mapping table. Then the terminal may perform correlation ($C_1$) between the received ESS and the standard $ESS_1$, and determine whether the $C_{max}$ value is smaller than a $C_1$ value for which the correlation is performed. If it is determined that the $C_{max}$ value is not smaller than the $C_1$ value for which the correlation is performed, the terminal may change the l value to the 'l+1' value. If the changed l value is smaller than 14, the process may be repeated from step S1135. For example, the terminal may change the l value to 2 and repeat the process from step S1135.

At step S1165, if the correlation is performed for all fourteen symbols by the above-described operation, the terminal may determine the symbol index of the ESS. Then, at step S1170, the terminal may determine the time synchronization position on the frame structure. For example, the terminal may determine a symbol index having the greatest peak value as a result of correlation. Then, based on the determined symbol index, the terminal may determine the time synchronization position with the base station.

Meanwhile, according to another embodiment of the present invention, when a time synchronization difference between base stations is small in a synchronized cell environment, a symbol index confirmed in a serving cell may be used equally in a neighbor cell.

Normally, the time synchronization difference between base stations may be smaller than ±0.5 symbol duration. Thus, the terminal may skip the ESS detection for neighbor cells, thereby enabling more efficient implementation in the multi-cell environment.

Meanwhile, according to still another embodiment of the present invention, a scheme of increasing the number of zadoff-chu sequences may be used. For example, in a typical communication system such as the LTE communication system, three zadoff-chu sequences may be used to distinguish three sectors. For example, the seed values 25, 29 and 34 of the zadoff-chu sequences may be used.

In an embodiment of the present invention, when there are three or more cells, various seed values may be further used to distinguish the symbol indexes in each cell. Accordingly, the zadoff-chu sequence can maintain the orthogonality for each base station of each cell. In this case, the terminal is allowed to check the symbol index separately for each base station of each cell.

Meanwhile, in the implementation of the ESS detection hardware for the terminal according to an embodiment of the present invention, the existing correlation hardware of the zadoff-chu sequence for the PSS detection may be time-shared. Also, for implementation, it is possible to add only a circular shift block to the front of the existing PSS detector hardware of the terminal.

Meanwhile, in the second embodiment of the present invention, a method for defining a new wireless network temporary identifier for a beam on a physical downlink control channel (PDCCH) in a wireless communication system that performs beamforming will be described.

Figure 12:
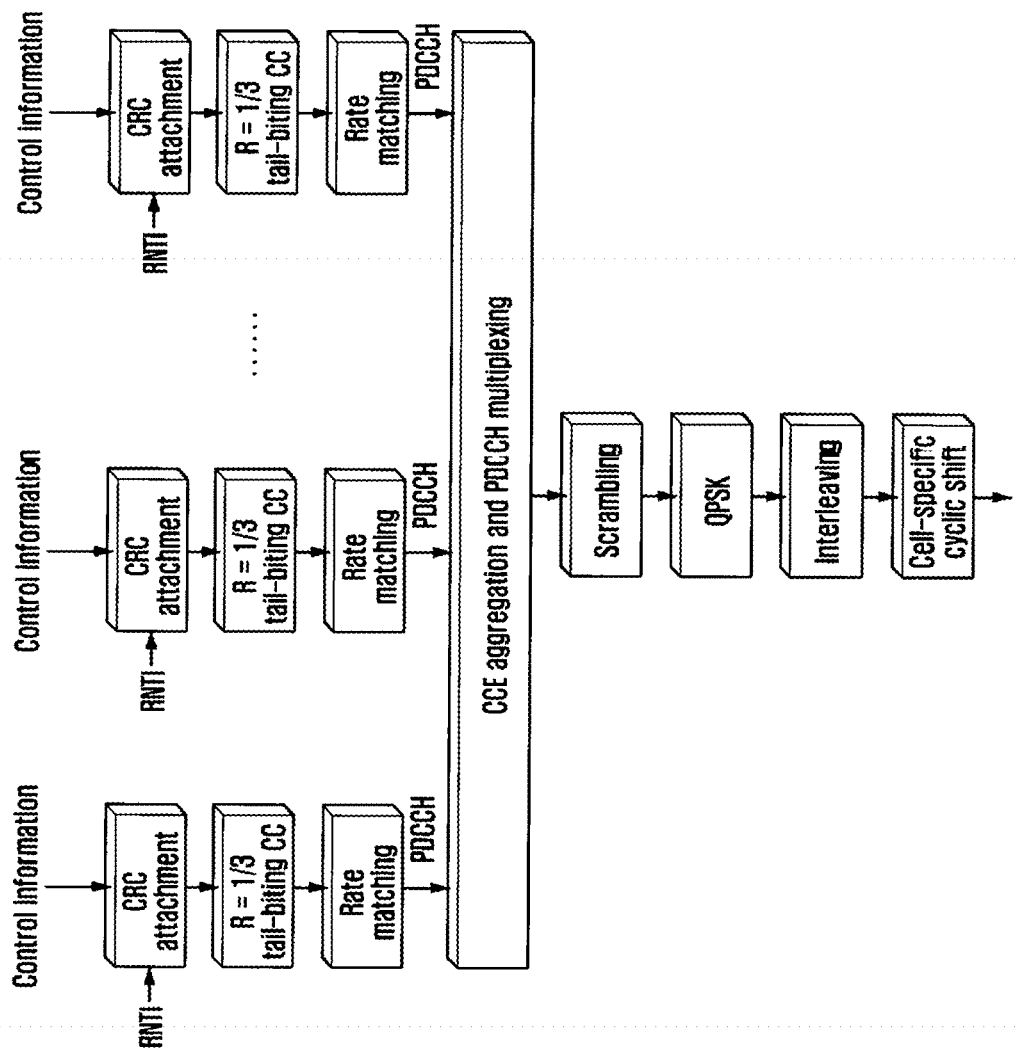
FIG. 12 is a diagram illustrating a method for a base station to encode and transmit downlink PDCCH information in a typical communication system.

As described above, the beamforming technique is a necessary technique for performing communication in a super-high frequency range. Beam information for operating the beamforming system may be transmitted mainly through a control channel. In a typical communication system (e.g., the LTE communication system), the base station may encode and transmit downlink PDCCH information as shown in FIG. 12.

In order to determine the validity of information, CRC information may be added to the control information. The CRC information may be added through scrambling with an RNTI value for proving the identity of a control signal. The terminal that receives the control information including the CRC information may descramble the control information by using its own radio network temporary identifier (RNTI), check the CRC, and thereby determine whether the control information has been transmitted to itself. The terminal may be allocated the RNTI when performing a random access procedure to the base station. Thus, the terminal may descramble the control information by using the RNTI allocated through the random access procedure, and then confirm whether the control information has been transmitted to the terminal itself.

FIG. 13 is a diagram illustrating types of RNTIs in a typical communication system. The RNTI may be composed of 16-bit.

As shown in FIG. 13, a cell-RNTI (C-RNTI) may be delivered to a specific user. A random access-RNTI (RA-RNTI) may be used as a response of a random access channel (RACH) signal. A transmit power control-RNTI (TPC-RNTI) may be used for the purpose of delivering power control information to a specific user group. In addition, a multimedia broadcast multicast services-RNTI (M-RNTI), a paging-RNTI (P-RNTI), and a system information-RNTI (SI-RNTI), which have fixed values, may be used for the purposes of transmitting MBMS data, paging information, and system information to all users of cell, respectively.

Figure 14:
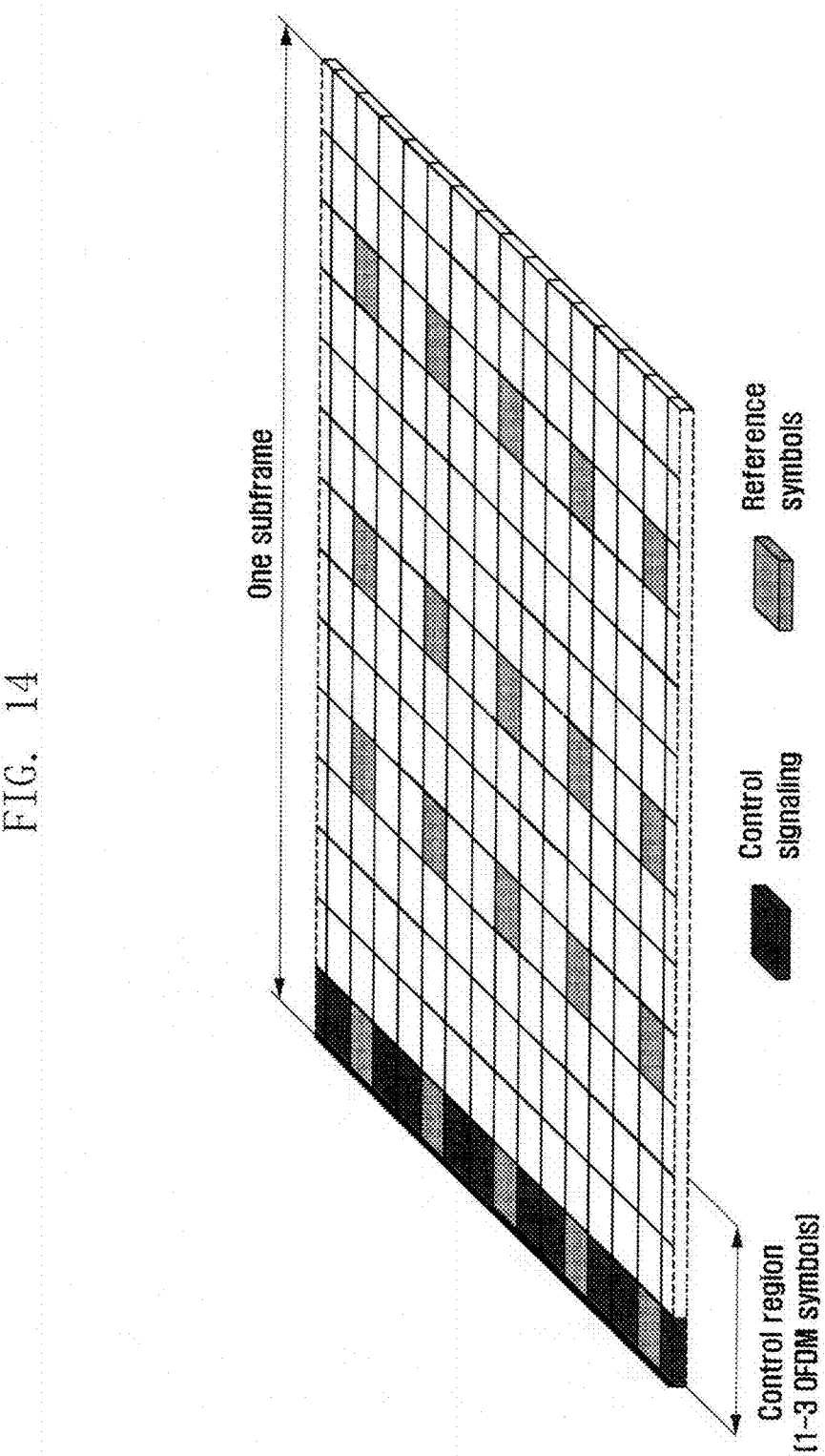
FIG. 14 is a diagram illustrating a subframe of transmitting a PDCCH signal in a typical communication system.

Meanwhile, FIG. 14 is a diagram illustrating a subframe of transmitting a PDCCH signal in a typical communication system. As shown in FIG. 14, in the typical communication system such as LTE, the PDCCH may be transmitted in first to third symbols of an arbitrary subframe.

The PDCCH as shown in FIG. 14 has control channel element (CCE) resources composed of nine resource element groups (REGs) (i.e., 36 available resource elements (REs)). Also, in order to utilize such resources efficiently, a search space is defined. The terminal may perform blind decoding for all candidates.

However, the number of decoding times of the terminal may be restricted so that the terminal does not perform a large number of blind decoding processes. Specifically, FIG. 15 is a diagram illustrating the number of decoding times of the terminal. As shown in FIG. 15, the number of decoding times of the terminal may be restricted to 44 in total including a search space, a CCE aggregation level, and data control information (DCI) format.

Figure 16:
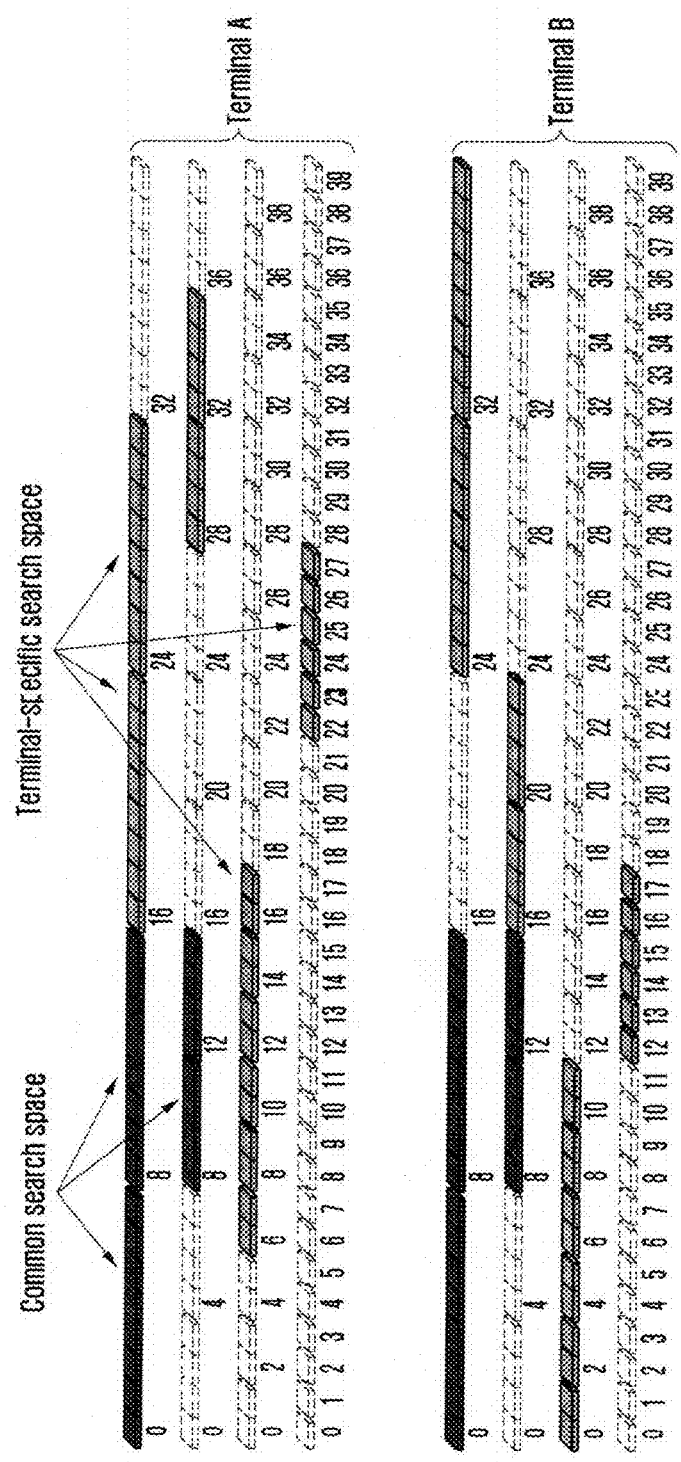
FIG. 16 is a diagram illustrating the details of a PDCCH CCE.

Meanwhile, FIG. 16 is a diagram illustrating the details of a PDCCH CCE. As shown in FIG. 16, the search space may be divided into a common search space to which all terminals are accessible, and a terminal-specific search space to which a specific terminal is accessible. Because a PDCCH transmission region is divided into a common section and a terminal-specific section, the PDCCH may be transmitted more efficiently.

In this case, control information such as M-RNTI, P-RNTI, and SI-RNTI that need to be transmitted to all terminals may be deployed in the common search space.

In addition, using the RNTI of the received PDCCH, each terminal may determine whether information has been transmitted to itself.

Figure 17:
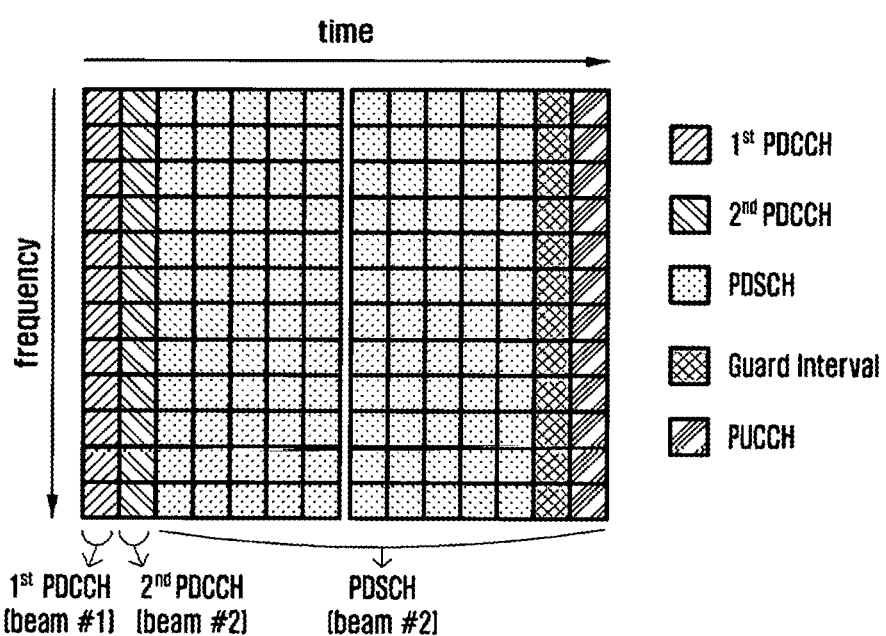
FIG. 17 is a diagram illustrating a downlink subframe structure of self-contained scheme using an analog beamforming technique.

Meanwhile, FIG. 17 is a diagram illustrating a downlink subframe structure of self-contained scheme using an analog beamforming technique. In a normal analog beamforming system, the base station is capable of performing transmission only in a specific beam direction on the time axis, and may generally switch beams on a symbol-by-symbol basis. Also, in order to transmit data control information (DCI) for decoding of a physical downlink shared channel (PDSCH), the base station may require one or more PDCCH symbols in the same beam direction as the PDSCH.

In addition, one or more PDCCH symbols may be required for the base station to transmit feedback on the PDCCH in response to previous uplink transmission of the terminal. Therefore, as shown in FIG. 17, two PDCCH symbols may be transmitted in general.

Meanwhile, the base station may perform scheduling for an arbitrary user in each subframe. Thus, the base station may transmit the PDCCH and the PDSCH by setting the beam in the direction requested by the user. Therefore, the direction of the beam transmitted in each subframe may be changed every time. In this case, if the direction of the beam transmitted by the base station and the beam direction of the terminal do not match, the terminal receives a signal with weak strength.

Figure 18:
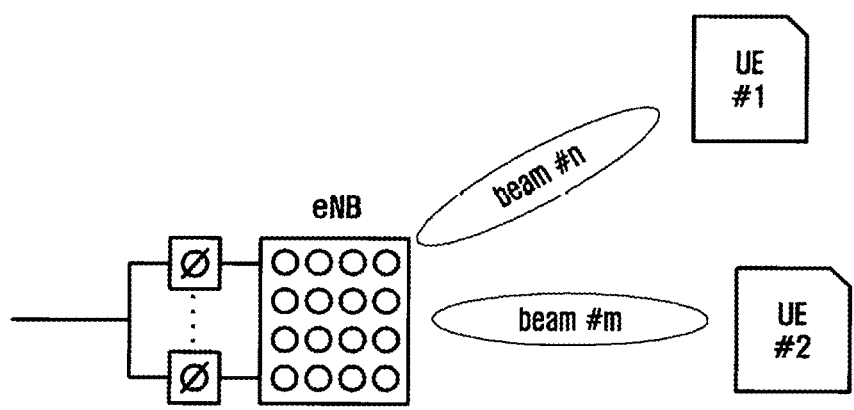
FIG. 18 is a diagram illustrating a plurality of terminals that receive beams in different directions.

For example, as shown in FIG. 18, the first terminal (UE #1) may have the beam transmission/reception direction coincident with the direction of the n-th beam transmitted by the base station (eNB), and the second terminal (UE #2) may have the beam transmission/reception direction coincident with the direction of the m-the beam transmitted by the base station. In this case, the first terminal receives, with weak strength, signals transmitted through beams other than the n-th beam. Also, the second terminal receives, with weak strength, signals transmitted through beams other than the m-th beam.

Therefore, the beam direction of the terminal needs to coincide with the direction of the beam transmitted by the base station. Nevertheless, the terminal has no way of knowing information about the beam transmitted by the base station. That is, there is no basis for determining whether the terminal can use a signal of the received subframe for the purpose of tracking synchronization and automatic gain control (AGC).

Figure 19:
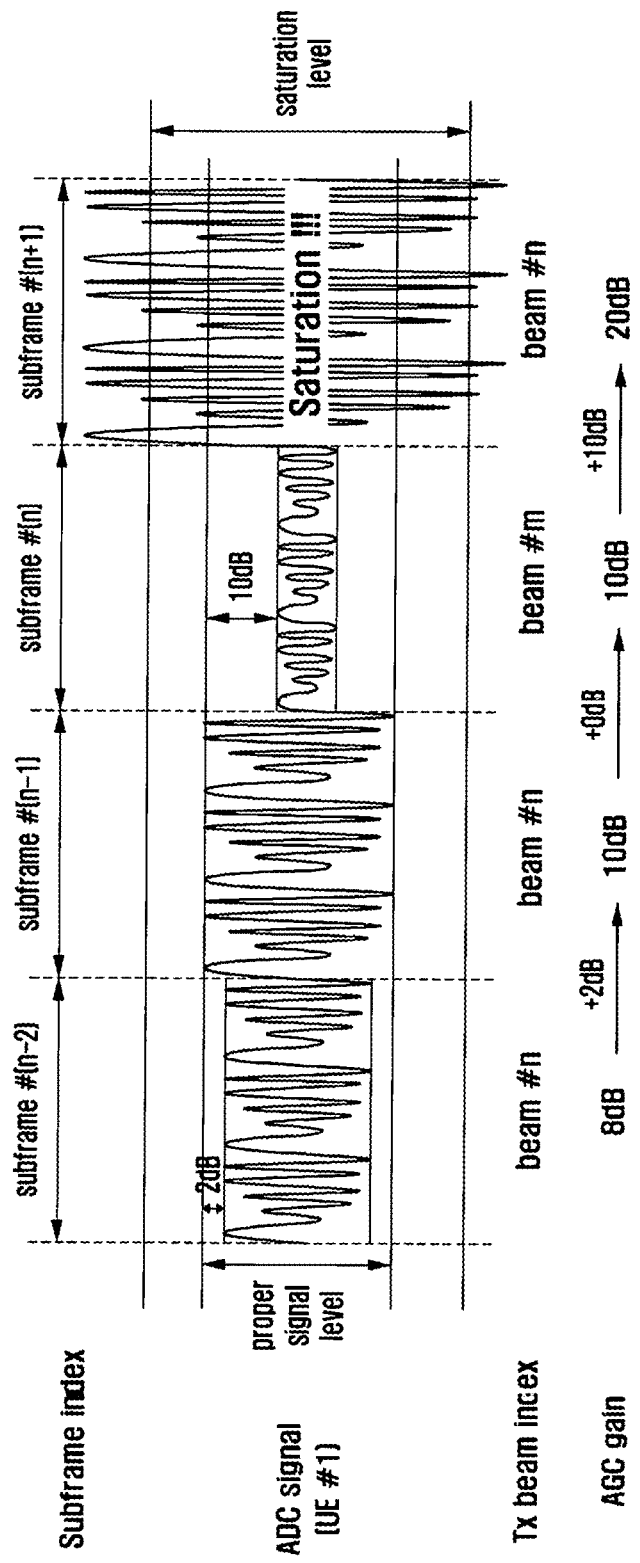
FIG. 19 is a diagram illustrating a problem of automatic gain control (AGC) tracking when a terminal is incapable of knowing a transmission beam direction.

FIG. 19 is a diagram illustrating a problem of automatic gain control (AGC) tracking when a terminal is incapable of knowing a transmission beam direction.

If the AGC is performed using any beam signal which does not coincide with the beam reception direction of the terminal in a certain subframe, and then if an optimum beam coinciding with the reception direction of the terminal is received in another subframe, the input signal level of analog digital converter (ADC) may be distorted. This may cause saturation, thus disabling the terminal to perform decoding of the received signal.

Specifically, as shown in FIG. 19, a case where the base station changes the beam direction to the beam #m in order to support the terminal #2 in the subframe #n will be described as an example. In this case, if the terminal #1 performs the AGC by using a signal of the subframe #n, the terminal #1 may increase the AGC gain in order to adjust the signal level which is insufficient by 10 dB. Therefore, in the subframe #(n+1) which is the next subframe, the saturation may occur when the terminal #1 receives a signal with the beam #n.

Meanwhile, in a typical communication system such as LTE, in case of desiring to transmit a control signal to all terminals belonging to a certain transmission beam direction, the base station should use individual C-RNTIs to transmit the control signal to all the terminals belonging to the transmission beam direction. Therefore, the base station may waste a lot of control resources.

A case where a transmission signal of the terminal existing in a beam of a certain direction from the base station A causes interference to the base station B will be described as an example. In this case, the base station A may have to transmit an uplink power control command to terminals corresponding to the beam of the above direction.

In the typical LTE communication system, the base station should transmit a power control command to the terminals corresponding to the beam of the above direction by using individual C-RNTIs. Alternatively, the base station should newly define a power control group using a TPC-RNTI whenever the terminal moves, and then transmit the defined power control group to the user through a radio resource control (RRC) signal.

In addition, because of failing to know the direction of the beam transmitted by the base station, the terminal has no way of confirming whether the optimum beam information of the terminal transmitted via an uplink signal such as a physical uplink control channel (PUCCH) or a physical uplink shared channel (PUSCH) has been properly offered as feedback to the base station.

Therefore, if the terminal offers feedback to the base station only in case of a change of the best transmission beam so as not to waste uplink resources, namely, if the terminal does not retransmit the feedback for the optimum beam to the base station, the data transmission between the base station and the terminal may be interrupted depending on a change in a channel environment.

In addition, because of failing to know the direction of the beam transmitted by the base station, the terminal may not know, even if the PDSCH is received, whether a corresponding transmitted signal is configured with a proper optimum beam, and may also not know retransmission or not.

Accordingly, in the second embodiment of the present invention, a radio network temporary identifier (RNTI) for the PDCCH is newly defined in a wireless communication system using a beamforming scheme, and a method for utilizing the newly defined RNTI for the PDCCH is proposed.

Figure 20:
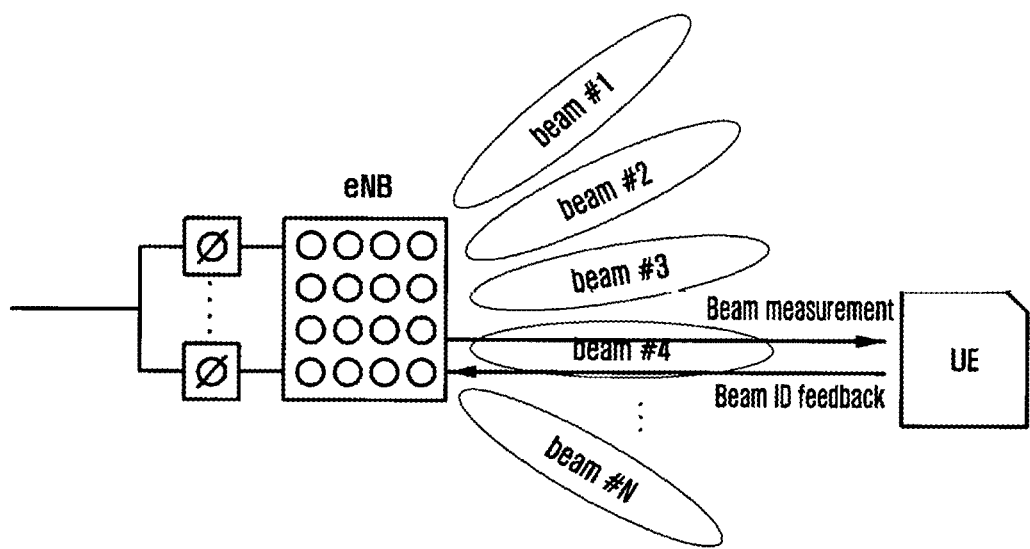
FIG. 20 is a diagram illustrating a configuration of a beamforming system.

FIG. 20 is a diagram illustrating a configuration of a beamforming system. Specifically, the beamforming system shown in FIG. 20 may be a system in which an identifier of a beam transmitted by the base station is fixed. In the beamforming system shown in FIG. 20, the base station may provide the terminal with beam measurement as a scheme capable of measuring channel status information (CSI) for all possible beams. Then the terminal may perform the beam measurement and offer feedback regarding the optimum transmission beam ID information through an uplink signal such as the PUCCH or the PUSCH. If the feedback is properly transmitted by the terminal, the base station may transmit a PDCCH or PDSCH signal by switching the transmission beam in the direction desired by the terminal.

The second embodiment of the present invention proposes two methods for allowing the terminal to know the identifier (ID) of the beam transmitted by the base station in a certain subframe.

First, the first method defines a new RNTI in the common search space of a PDCCH region, and allows all terminals receiving a subframe including the PDCCH region to know a transmission beam ID of a current subframe by using the new RNTI. Hereinafter, the new RNTI proposed in the first method will be referred to as a beam-RNTI (B-RNTI).

Therefore, the base station may transmit, to the terminal, the PDCCH signal of the CRC scrambled with the B-RNTI.

This method of transmitting the B-RNTI, as the new RNTI, in the common search space has an advantage of utilizing the existing PDCCH transmission structure. Therefore, it is possible to extend the communication method using beamforming on the basis of the existing communication method. In addition, as described above, because the PDCCH including the B-RNTI is transmitted in an early part of a subframe, the terminal that receives the B-RNTI may have a time margin of coping with it.

The base station may transmit the beam ID of the transmission beam by allocating an explicit field in the DCI transmitted with the B-RNTI. Alternatively, the base station may increase the number of B-RNTIs by the number of transmission beam IDs required by the base station. In this case, the terminal may know the beam ID from the B-RNTI number of the corresponding PDCCH.

Meanwhile, the transmission position of the B-RNTI in the PDCCH may be fixed to a specific position. Alternatively, the B-RNTI may be transmitted at an arbitrary position in the common search space and may be deployed depending on the situation of the base station.

When the transmission position of the B-RNTI is fixed to a specific position, there is an advantage that the number of blind decoding times of the terminal may be reduced. However, there may be a disadvantage that the flexibility of the base station is restricted. If it is possible to freely allocate the B-RNTI together with other common RNTIs in the common search space, the base station may determine whether to transmit the B-RNTI PDCCH depending on the situation.

According to embodiments, there may be three methods of defining the DCI format necessary for transmission of the B-RNTI, as follows.

1) Method of allocating the DCI format having a new message size

2) Method of using the existing message size as it is, and indicating the transmission of the beam ID according to bit configuration of a specific field in the DCI format 3) Method of using the existing message size as it is, changing only the RNTI used for the scramble of the CRC to the B-RNTI, and defining a new control signaling message field when the CRC is matched by the B-RNTI The first method has an advantage of efficiently using resources allocated to the PDCCH, even though the number of blind decoding times of the terminal may be increased. In contrast, the second and third methods do not increase the number of blind decoding times of the terminal, but it may be difficult to optimize the transmission in the base station. Meanwhile, the second method may suffer a loss of one bit in comparison with the third method. Therefore, the base station may use one of the above methods, depending on the transmission environment or the situation thereof.

If the beam ID is not distinguished by the B-RNTI in the field of the control signaling message, the base station may add the beam ID of a currently transmitted beam. In addition, if the terminal needs to know a transmission antenna ID of the base station, the base station may add the antenna ID. If the amount of information required for the B-RNTI is much smaller than the existing message size, a coding gain may be added to further obtain a link budget.

Meanwhile, according to embodiments of the present invention, methods for the base station to allocate the B-RNTI are as follows.

1) Method of defining one B-RNTI for all antennas of the base station, having a need to transmit an explicit beam ID in the DCI, and having a need to transmit a base station antenna ID in the DCI if necessary 2) Method of defining different B-RNTIs for respective antennas of the base station, having a need to transmit an explicit beam ID in the DCI, and having no need to transmit a base station antenna ID in the DCI 3) Method of allocating the B-RNTI for every beam of the base station, and transmitting a corresponding B-RNTI for each beam, having no need to transmit an explicit beam ID or base station antenna ID in the DCI The third method is a method of transmitting the beam ID of the base station most reliably. However, the third method requires a large number of RNTIs and may further require processing for PDCCH blind decoding of the terminal.

In contrast, the first method requires only one RNTI, and processing for PDCCH blind decoding of the terminal may be minimized. On the other hand, the base station is vulnerable to interference between antennas, and it is necessary to guarantee orthogonality by a method such as frequency division multiplexing (FDM).

The second method may require the B-RNTIs corresponding to the maximum number of base station antennas. Also, the blind decoding may be increased in proportion to the maximum number of antennas of the base station.

Thus, the first to third methods may be selected depending on design conditions of the communication system.

In the second method proposed for enabling the terminal to know a beam identifier (ID) transmitted by the base station in a certain subframe, the base station may apply different seeds, by beams, of scramble or interleaving to a reference signal existing in a subframe. The terminal may confirm the transmission beam of the base station by using the reference signal.

In this case, additional resources may not be required as compared with a method of directly transmitting the beam ID on the PDCCH. However, if the transmission beam ID of the base station differs from the transmission beam ID expected by the terminal, the transmitted reference signal may not be used. So, communication may not be performed.

As described above, if the terminal is capable of confirming the transmission beam ID of the base station, it may be used for various purposes.

Specifically, the terminal may skip a subframe corresponding to an undesired transmission beam ID. In addition, the terminal may perform tracking of AGC and synchronization in case of a subframe corresponding to a transmission beam ID desired to be received.

Figure 21:
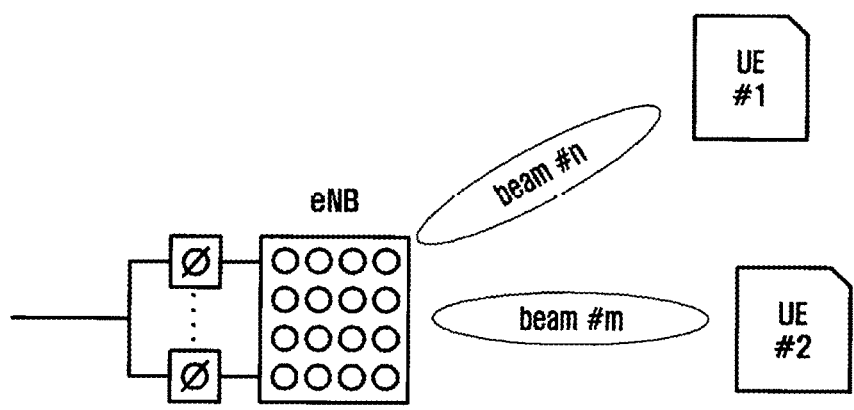
FIG. 21 is a diagram illustrating a plurality of terminals that receive beams in different directions.

For example, FIG. 21 is a diagram illustrating a plurality of terminals that receive beams in different directions. In case of FIG. 21, the first terminal (UE #1) may have the beam transmission/reception direction coincident with the direction of the n-th beam transmitted by the base station (eNB), and the second terminal (UE #2) may have the beam transmission/reception direction coincident with the direction of the m-the beam transmitted by the base station.

Figure 22:
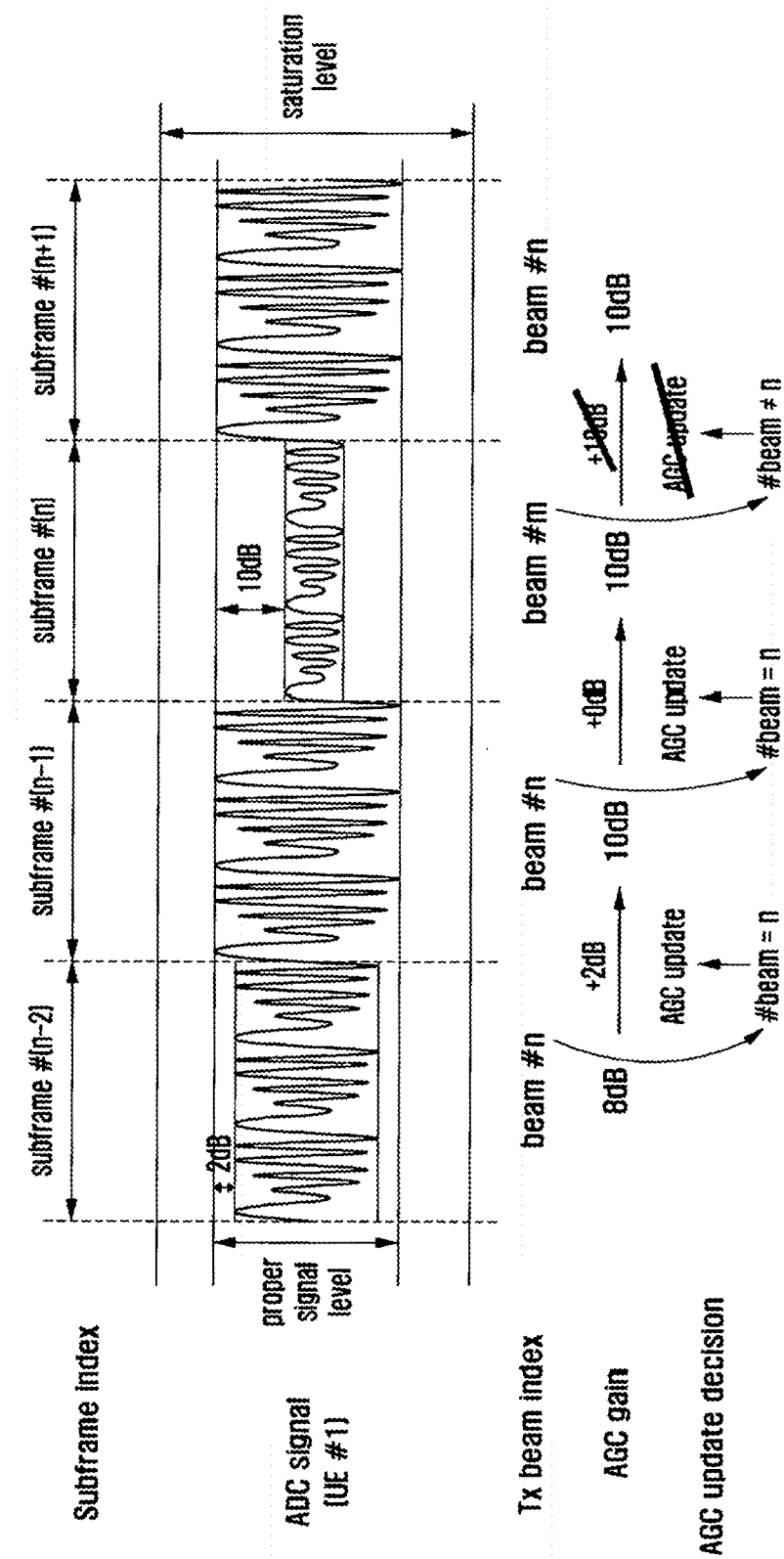
FIG. 22 is a diagram illustrating a method for solving an AGC tracking problem when a terminal knows a transmission beam direction.

FIG. 22 is a diagram illustrating a method for solving an AGC tracking problem when a terminal knows a transmission beam direction.

For example, as shown in FIG. 22, when the transmission beam (beam #m) of the subframe #n is not the beam (e.g., beam #n) desired to be received by the first terminal, the first terminal may not update AGC and synchronization information acquired in the subframe #n.

According to an embodiment of the present invention, the first terminal may confirm the ID of the beam transmitted by the base station. Then the first terminal may determine that the transmission beam of the subframe #n is not the beam #n. Thus, the first terminal may continuously maintain information of the previous subframe.

Accordingly, when the transmission beam of the base station does not coincide with the beam to be received by the terminal, the terminal may not be affected by the AGC.

Because the channel conditions are generally different for each transmission beam, the above may be applied to the case of synchronization. For example, if the beam ID is not matched, the terminal may stop updating a synchronization function such as symbol timing recovery (STR). In addition, by maintaining information on the previous beam and synchronizing with the direction of the beam different from the direction of the beam to be received by the terminal, it is possible to prevent performance from being degraded.

If the beam desired to be received by the terminal and the transmission beam of the base station have the identical beam ID, the terminal may perform the AGC and synchronization update by using a demodulation reference signal (DM-RS) existing in the subframe or a reference signal on the PDCCH.

Figure 23:
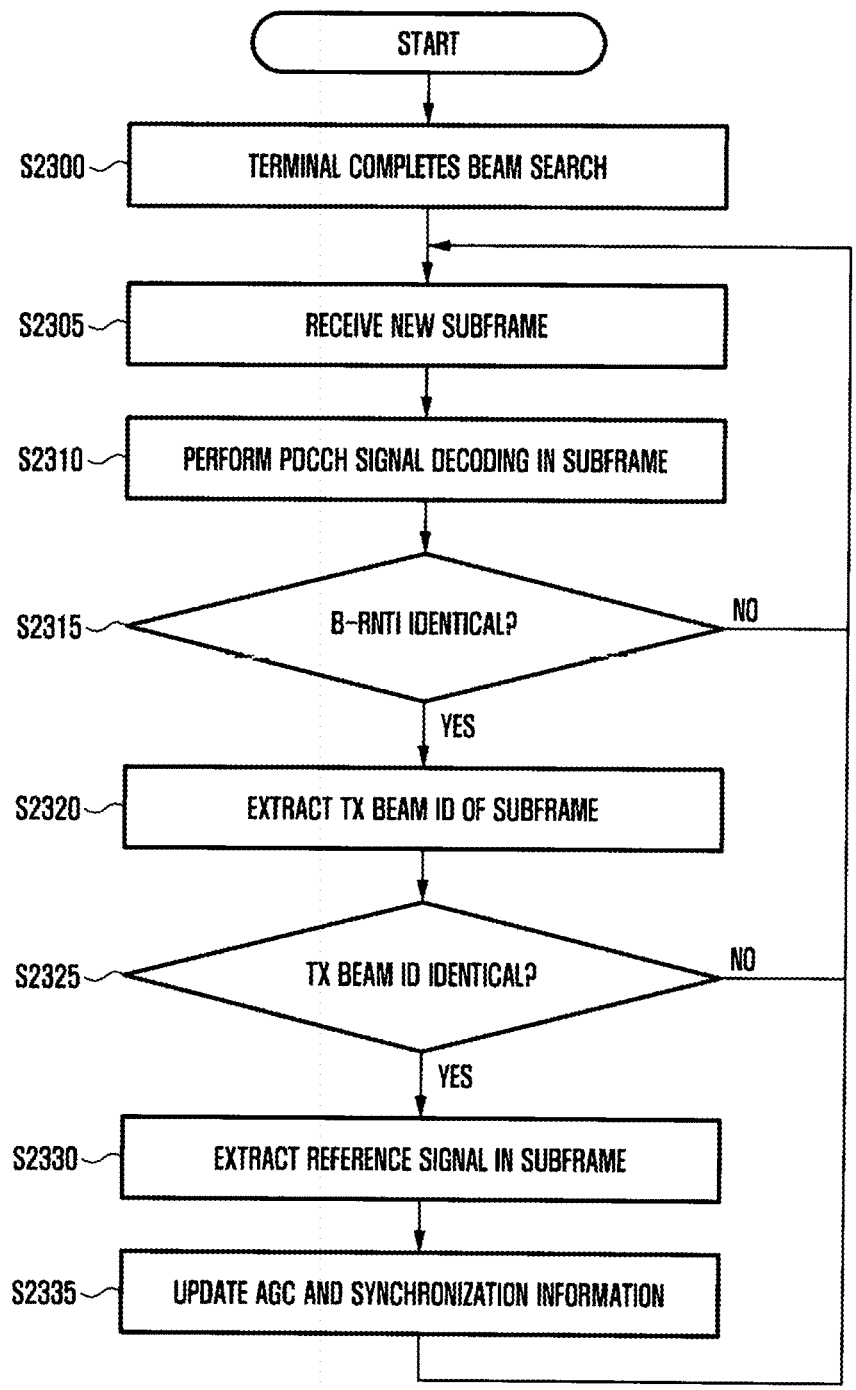
FIG. 23 is a flow diagram illustrating a method for acquiring a transmission beam ID of a base station and using it in AGC and synchronization tracking according to an embodiment of the present invention.

Hereinafter, a method for acquiring the transmission beam ID of the base station and using it for the AGC and synchronization tracking according to an embodiment of the present invention will be described in detail with reference to FIG. 23.

First, at step S2300, the terminal completes a beam search. Then, at step S2305, the terminal may receive a new subframe.

In addition, at step S2310, the terminal may decode a PDCCH signal in the subframe. As described above, the base station may transmit a newly defined B-RNTI to the terminal in the common search space of the PDCCH region. Therefore, the terminal may confirm the B-RNTI by decoding the PDCCH signal in the subframe.

At step S2315, the terminal may check whether the previously allocated B-RNTI is identical with the B-RNTI transmitted through the PDCCH by the base station. If the B-RNTI of the terminal is identical with the B-RNTI transmitted by the base station, the terminal may determine that the received subframe is received through the optimum beam of the terminal.

Therefore, at step S2320, the terminal may extract information about the transmission beam ID of the subframe. Then, at step S2325, the terminal may confirm whether the transmission beam ID is identical with the identifier of the reception beam of the terminal.

As described above, the terminal may identify its own optimum beam by receiving the beam measurement from the base station and measuring the CSIs for all beams. Also, the terminal may determine an identifier of the identified optimum beam as the received beam identifier. Therefore, the terminal may extract the transmission beam ID information with the identical B-RNTI, and confirm whether it is identical with the reception beam identifier.

If the transmission beam ID is identical with the identifier of the reception beam of the terminal, the terminal may extract a reference signal in the subframe at step S2330. Then, at step S2335, the terminal may update the AGC and synchronization information as described above.

Whenever a new subframe is received, the terminal may repeat the above-described steps S2305 to S2335.

Meanwhile, when the terminal performs feedback of a beam index on the PUCCH, the B-RNTI may be used to confirm whether information on the feedback is properly transmitted to the base station.

Figure 24:
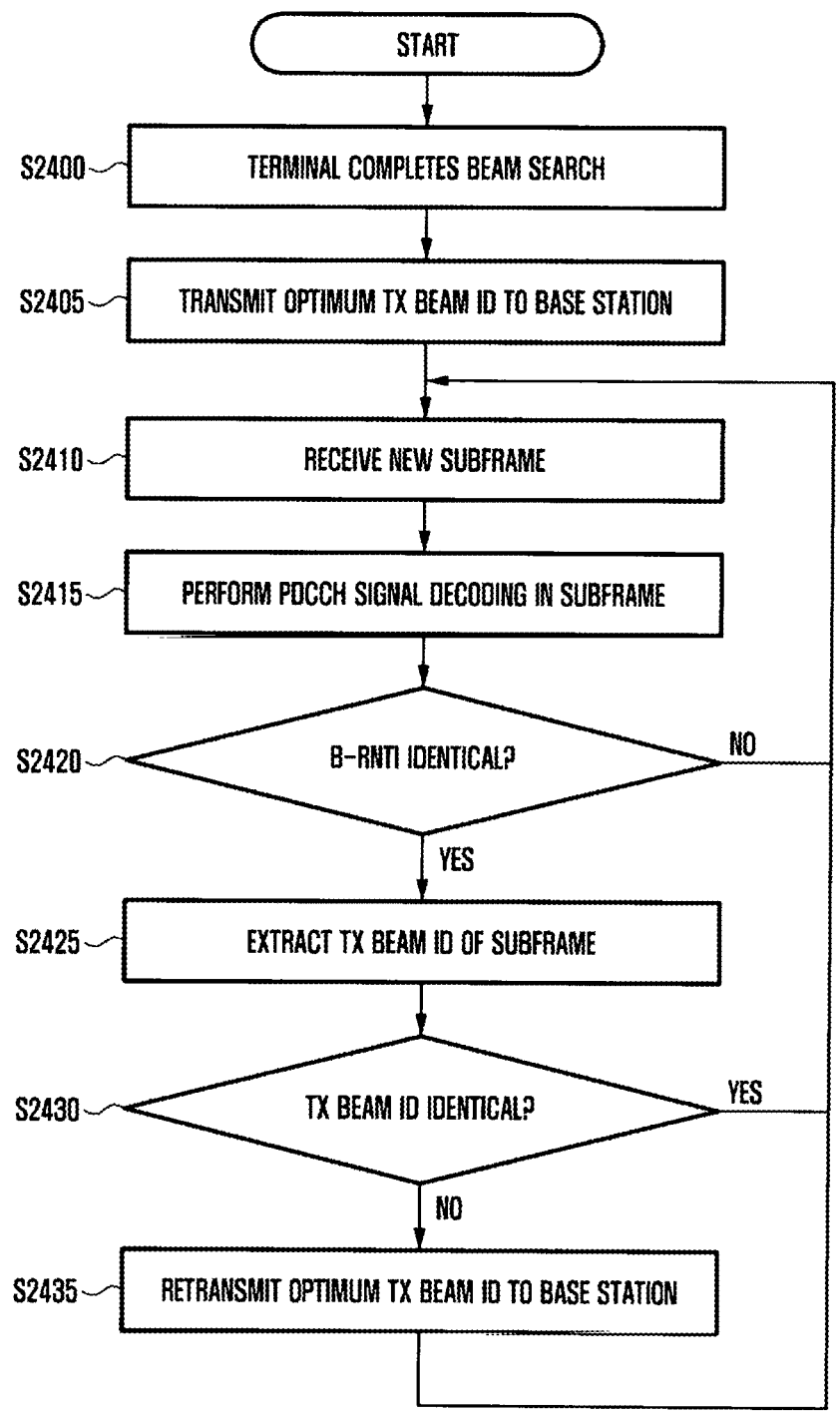
FIG. 24 is a flow diagram illustrating a method for a terminal to confirm a result of a beam index feedback on a PUCCH.

Hereinafter, a method for the terminal to confirm a result of the beam index feedback on the PUCCH will be described in detail with reference to FIG. 24.

First, at step S2400, the terminal completes the beam search. Then, at step S2405, the terminal may transmit the optimum transmission beam ID to the base station. For example, as described in FIG. 23, when the transmission beam ID of the subframe transmitted by the base station is identical with the reception beam identifier of the terminal, the terminal may determine the identical transmission beam ID as the optimum transmission beam ID. Then, the terminal may offer, as feedback, the determined optimum transmission beam ID to the base station.

If the terminal receives a new subframe at step S2410, the terminal may decode a PDCCH signal in the subframe at step S2415. As described above, the base station may transmit the B-RNTI to the terminal in the common search space of the PDCCH region. Therefore, the terminal may identify the B-RNTI by decoding the PDCCH signal in the subframe.

At step S2420, the terminal may check whether the previously allocated B-RNTI is identical with the B-RNTI transmitted through the PDCCH by the base station. If the B-RNTI of the terminal is identical with the B-RNTI transmitted by the base station, the terminal may determine that the received subframe is received through the optimum beam of the terminal.

Therefore, at step S2425, the terminal may extract information about the transmission beam ID of the subframe. Then, at step S2430, the terminal may confirm whether the transmission beam ID is identical with the identifier (the optimum transmission beam ID described above) of the reception beam of the terminal.

If the transmission beam ID is not identical with the identifier of the reception beam of the terminal, the terminal may retransmit the optimum transmission beam ID to the base station at step S2435.

Therefore, if the beam index obtained with the B-RNTI in the subframe in which the terminal receives the PDSCH with the C-RNTI is coincident with the optimum beam transmitted in the PUCCH previously, it may be confirmed that the PUCCH feedback is properly performed to the base station. If not, the terminal may attempt to retransmit information on the optimum beam to the base station. Accordingly, it is possible to reduce the rate of occurrence of connection loss with the base station, which is caused by the failure of optimum beam transmission.

Meanwhile, the B-RNTI may also be used to send common control information to a user belonging to the corresponding beam.

For example, when a transmission signal of the terminal existing in a beam of a specific direction of the base station causes great interference to other base stations, a situation may arise in which a transmission power control command should be delivered to the terminal existing in a beam of a specific direction of the base station #1.

If the base station sends an individual command to all terminals belonging to the beam by using the C-RNTI or newly making a power control group, the overhead may become very large. Further, whenever the terminal moves in the transmission beam region, the base station should inform new TPC-RNTI information at the RRC level.

At this time, since the terminals of the beam can commonly obtain the DCI by using the B-RNTI of the present invention as described above, power control of such a beam group may be performed through single command transmission.

According to another example of the present invention, when a channel state of the terminal belonging to a specific beam changes abruptly, the base station may use the B-RNTI for the purpose of requesting the terminals of the specific beam to transmit a sounding reference signal (SRS) on the uplink or CSI for a current downlink channel.

Figure 25:
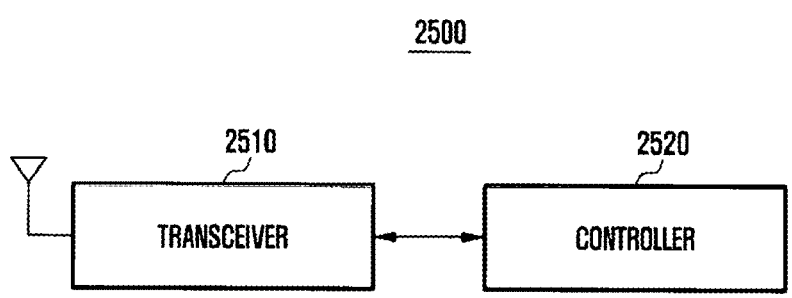
FIG. 25 is a block diagram illustrating elements of a base station according to an embodiment of the present invention.

Meanwhile, FIG. 25 is a block diagram illustrating elements of a base station according to an embodiment of the present invention. The base station 2500 may include a transceiver 2510 and a controller 2520.

The transceiver 2510 is an element for transmitting and receiving signals to and from a device such as another base station or a terminal.

The controller 2520 may wholly control the base station 2500. For example, the controller 2520 may control to generate the first synchronization signal. In addition, the controller 2520 may identify symbol index information on a plurality of symbols transmitted through beams of different directions. Also, the controller 2520 may control the transceiver 2510 to transmit the first synchronization signal and the symbol index information in each of the plurality of symbols.

The symbol index information may be configured based on at least one bit and may be transmitted through a physical broadcast channel (PBCH).

Also, the symbol index information may be a second synchronization signal configured to distinguish the plurality of symbols, based on a predetermined sequence.

The second synchronization signal may be an extended synchronization signal (ESS) generated based on a zadoff-chu sequence, and the first synchronization signal may be a primary synchronization signal (PSS).

Meanwhile, the controller 2520 may perform all operations of the base station 2500 described in the present invention.

Figure 26:
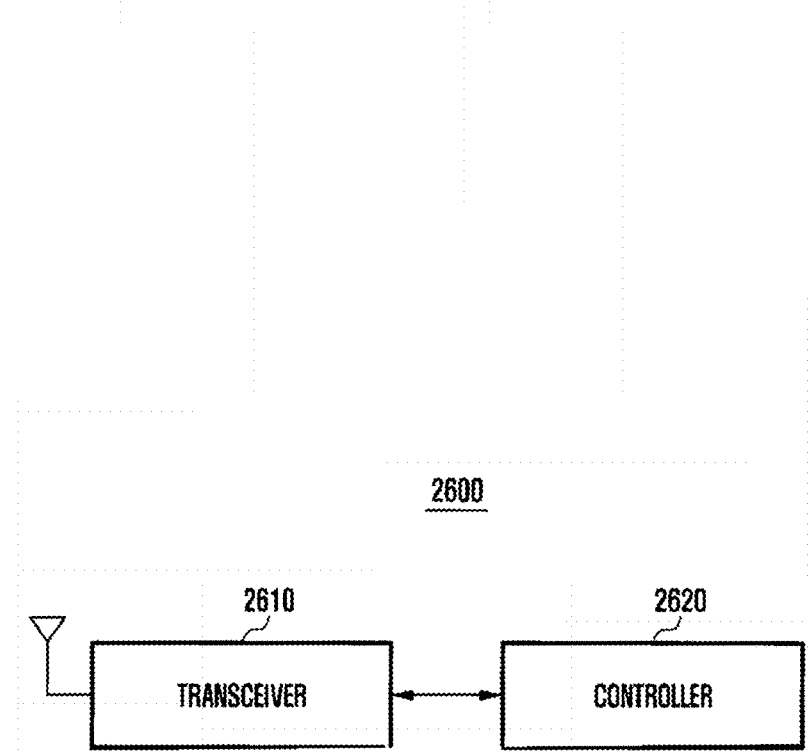
FIG. 26 is a block diagram illustrating elements of a terminal according to an embodiment of the present invention.

FIG. 26 is a block diagram illustrating elements of a terminal according to an embodiment of the present invention. The terminal 2600 may include a transceiver 2610 and a controller 2620.

The transceiver 2610 is an element for transmitting and receiving signals to and from a base station or any other external device.

The controller 2620 may control the transceiver 2610 to receive the first synchronization signal and symbol index information in each of a plurality of symbols, and acquire synchronization, based on the received first synchronization signal and the received symbol index information.

The symbol index information may be configured based on at least one bit and may be received through a physical broadcast channel (PBCH).

Also, the symbol index information may be a second synchronization signal configured to distinguish the plurality of symbols, based on a predetermined sequence.

The second synchronization signal may be an extended synchronization signal (ESS) generated based on a zadoff-chu sequence, and the first synchronization signal may be a primary synchronization signal (PSS).

Meanwhile, the controller 2620 may perform all operations of the terminal 2600 described in the present invention.

The above-described elements of the terminal and the base station may be implemented by software. For example, the controllers of the terminal and the base station may further include a flash memory or other nonvolatile memory. The nonvolatile memory may store a program for performing each function of the controller.

In addition, the controllers of the terminal and the base station may be implemented in a form including a CPU and a random access memory (RAM). The CPU of the controller may copy the above-described programs stored in the nonvolatile memory into the RAM, and then execute the copied programs to perform the functions of the terminal as described above.

The controller is responsible for controlling the terminal or the base station. The controller may be used in the same meaning as a central processing unit, a microprocessor, a processor, an operating system, or the like. Also, the controllers of the terminal and the base station may be implemented as a single-chip system (system-on-a-chip, system on chip, SOC, or SoC) together with other functional units such as a communication module included in the terminal.

Meanwhile, the methods of the terminal and the base station according to the above-described various embodiments may be software-coded and stored in a non-transitory readable medium. Such non-transiently readable media can be used in various devices.

Non-transitory readable medium refers to a medium that stores data for a short period of time such as a register, a cache, and a memory, but semi-permanently stores data and can be read by the apparatus. Specifically, it may be a CD, a DVD, a hard disk, a Blu-ray disk, a USB, a memory card, a ROM, or the like.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. A method of a base station in a wireless communication system, comprising:
   generating a first synchronization signal comprising a primary synchronization signal (PSS) and a secondary synchronization signal (SSS);
   identifying symbol index information for each of a plurality of symbols transmitted through a plurality of beams of different directions, wherein the symbol index information indicates which symbol in the plurality of symbols is used for transmission of the first synchronization signal; and
   transmitting, in each one of the plurality of symbols, the first synchronization signal, a physical broadcast channel (PBCH), and an extended synchronization signal (ESS) comprising the symbol index information of the one of the plurality of symbols,
   wherein the first synchronization signal, the PBCH, and the ESS each occupy different subcarriers in the one of the plurality of symbols, and
   wherein the ESS includes the symbol index information based on a zadoff-chu sequence circularly shifted on a frequency axis.

2. A base station in a wireless communication system, comprising:
   a transceiver configured to transmit and receive signals; and
   a controller configured to:
      generate a first synchronization signal comprising a primary synchronization signal (PSS) and a secondary synchronization signal (SSS);
      identify symbol index information for each of a plurality of symbols transmitted through beams of different directions, wherein the symbol index information indicates which symbol in the plurality of symbols is used for transmission of the first synchronization signal; and
      control the transceiver to transmit, in each one of the plurality of symbols, the first synchronization signal a physical broadcast channel (PBCH) and an extended synchronization signal (ESS) comprising the symbol index information of symbols of the one of the plurality of symbols, wherein the first synchronization signal, the PBCH, and the ESS each occupy different subcarriers in the one of the plurality of symbols, and wherein the ESS includes the symbol index information based on a zadoff-chu sequence circularly shifted on a frequency axis.

3. A method of a terminal in a wireless communication system, comprising:

receiving, in each one of a plurality of symbols, a first synchronization signal comprising a primary synchronization signal (PSS) and a secondary synchronization signal (SSS), a physical broadcast channel (PBCH), and an extended synchronization signal (ESS) comprising symbol index information the one of the plurality of symbols; and acquiring synchronization, based on the received first synchronization signal and the received symbol index information, wherein the symbol index information is information corresponding to the plurality of symbols transmitted through a plurality of beams of different directions, and wherein the symbol index information is used to determine a subframe boundary by indicating which symbol of the plurality of symbols is used for transmission of the first synchronization signal, and wherein the ESS includes the symbol index information based on a zadoff-chu sequence circularly shifted on a frequency axis.

4. A terminal in a wireless communication system, comprising:

a transceiver configured to transmit and receive signals; and a controller configured to:

control the transceiver to receive, in each one of a plurality of symbols, a first synchronization signal comprising a primary synchronization signal (PSS) and a secondary synchronization signal (SSS), a physical broadcast channel (PBCH), and an extended synchronization signal (ESS) comprising symbol index information the one of the plurality of symbols; and acquire synchronization, based on the received first synchronization signal and the received symbol index information, wherein the symbol index information is information corresponding to the plurality of symbols transmitted through a plurality of beams of different directions, and wherein the symbol index information is used to determine a subframe boundary by indicating which symbol of the plurality of symbols is used for transmission of the first synchronization signal, and wherein the ESS includes the symbol index information based on a zadoff-chu sequence circularly shifted on a frequency axis.

* * * * *